(12) United States Patent
Brinlee et al.

(10) Patent No.: US 8,514,593 B2
(45) Date of Patent: Aug. 20, 2013

(54) POWER CONVERTER EMPLOYING A VARIABLE SWITCHING FREQUENCY AND A MAGNETIC DEVICE WITH A NON-UNIFORM GAP

(75) Inventors: Antony Brinlee, Plano, TX (US); Aaron Jungreis, Richardson, TX (US); Arturo Silva, Allen, TX (US); Paul Garrity, Rockwall, TX (US)

(73) Assignee: Power Systems Technologies, Ltd., Ebene (MU)

( * ) Notice: Subject to any disclaimer, the term of this patent is extended or adjusted under 35 U.S.C. 154(b) by 433 days.

(21) Appl. No.: 12/486,520

(22) Filed: Jun. 17, 2009

(65) Prior Publication Data

US 2010/0321958 A1   Dec. 23, 2010

(51) Int. Cl.
*H02M 3/335* (2006.01)

(52) U.S. Cl.
USPC ........................................... 363/21.12

(58) Field of Classification Search
USPC ............... 363/20, 21.01, 21.02, 21.04, 21.05, 363/21.12, 95, 21.13, 97
See application file for complete search history.

(56) References Cited

U.S. PATENT DOCUMENTS

| | | |
|---|---|---|
| 1,376,978 A | 5/1921 | Stoekle |
| 2,473,662 A * | 6/1949 | Pohm ................................. 363/4 |
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,602,795 A | 8/1971 | Gunn |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,019,122 A | 4/1977 | Ryan |
| 4,075,547 A | 2/1978 | Wroblewski |
| 4,202,031 A | 5/1980 | Hesler et al. |

(Continued)

FOREIGN PATENT DOCUMENTS

| | | |
|---|---|---|
| CN | 101141099 | 3/2008 |
| CN | 201252294 | 6/2009 |

(Continued)

OTHER PUBLICATIONS

Freescale Semiconductor, "Implementing a Digital AC/DC Switched-Mode Power Supply using a 56F8300 Digital Signal Controller," Application Note AN3115, Aug. 2005, 24 pp., Chandler, AZ.

(Continued)

*Primary Examiner* — Adolf Berhane
(74) *Attorney, Agent, or Firm* — Boisbrun Hofman, PLLC

(57) ABSTRACT

A power converter including a power switch, a controller for controlling a switching frequency thereof, and a magnetic device with a non-uniform gap. In one embodiment, the power converter includes a power switch and a magnetic device coupled to the power switch and having a non-uniform gap. The power converter also includes a controller having a detector configured to sense a condition representing an output power of the power converter. A control circuit of the controller is configured to control a switching frequency of the power switch as a function of the condition and control a duty cycle of the power switch to regulate an output characteristic of the power converter.

20 Claims, 13 Drawing Sheets

(56) References Cited

U.S. PATENT DOCUMENTS

| | | | |
|---|---|---|---|
| 4,257,087 | A | 3/1981 | Cuk |
| 4,274,071 | A | 6/1981 | Pfarre |
| 4,327,348 | A | 4/1982 | Hirayama |
| 4,471,423 | A | 9/1984 | Hase |
| 4,499,481 | A | 2/1985 | Greene |
| 4,570,174 | A | 2/1986 | Huang et al. |
| 4,577,268 | A | 3/1986 | Easter et al. |
| 4,581,691 | A | 4/1986 | Hock |
| 4,613,841 | A | 9/1986 | Roberts |
| 4,636,823 | A | 1/1987 | Margalit et al. |
| 4,660,136 | A | 4/1987 | Montorefano |
| 4,770,667 | A | 9/1988 | Evans et al. |
| 4,770,668 | A | 9/1988 | Skoultchi et al. |
| 4,785,387 | A | 11/1988 | Lee et al. |
| 4,799,138 | A | 1/1989 | Chahabadi et al. |
| 4,803,609 | A | 2/1989 | Gillett et al. |
| 4,823,249 | A | 4/1989 | Garcia, II |
| 4,837,496 | A | 6/1989 | Erdi |
| 4,853,668 | A | 8/1989 | Bloom |
| 4,866,367 | A | 9/1989 | Ridley et al. |
| 4,876,638 | A | 10/1989 | Silva et al. |
| 4,887,061 | A | 12/1989 | Matsumura |
| 4,899,271 | A | 2/1990 | Seiersen |
| 4,903,089 | A | 2/1990 | Hollis et al. |
| 4,922,400 | A | 5/1990 | Cook |
| 4,962,354 | A | 10/1990 | Visser et al. |
| 4,964,028 | A | 10/1990 | Spataro |
| 4,999,759 | A | 3/1991 | Cavagnolo et al. |
| 5,003,277 | A | 3/1991 | Sokai et al. |
| 5,014,178 | A | 5/1991 | Balakrishnan |
| 5,027,264 | A | 6/1991 | DeDoncker et al. |
| 5,068,756 | A | 11/1991 | Morris et al. |
| 5,106,778 | A | 4/1992 | Hollis et al. |
| 5,126,714 | A | 6/1992 | Johnson |
| 5,132,888 | A | 7/1992 | Lo et al. |
| 5,134,771 | A | 8/1992 | Lee et al. |
| 5,172,309 | A | 12/1992 | DeDoncker et al. |
| 5,177,460 | A | 1/1993 | Dhyanchand et al. |
| 5,182,535 | A | 1/1993 | Dhyanchand |
| 5,204,809 | A | 4/1993 | Andresen |
| 5,206,621 | A | 4/1993 | Yerman |
| 5,208,739 | A | 5/1993 | Sturgeon |
| 5,223,449 | A | 6/1993 | Morris et al. |
| 5,225,971 | A | 7/1993 | Spreen |
| 5,231,037 | A | 7/1993 | Yuan et al. |
| 5,244,829 | A | 9/1993 | Kim |
| 5,262,930 | A | 11/1993 | Hua et al. |
| 5,282,126 | A | 1/1994 | Husgen |
| 5,285,396 | A | 2/1994 | Aoyama |
| 5,291,382 | A | 3/1994 | Cohen |
| 5,303,138 | A | 4/1994 | Rozman |
| 5,305,191 | A | 4/1994 | Loftus, Jr. |
| 5,335,163 | A | 8/1994 | Seiersen |
| 5,336,985 | A | 8/1994 | McKenzie |
| 5,342,795 | A | 8/1994 | Yuan et al. |
| 5,343,140 | A | 8/1994 | Gegner |
| 5,353,001 | A | 10/1994 | Meinel et al. |
| 5,369,042 | A | 11/1994 | Morris et al. |
| 5,374,887 | A | 12/1994 | Drobnik |
| 5,399,968 | A | 3/1995 | Sheppard et al. |
| 5,407,842 | A | 4/1995 | Morris et al. |
| 5,459,652 | A | 10/1995 | Faulk |
| 5,468,661 | A | 11/1995 | Yuan et al. |
| 5,477,175 | A | 12/1995 | Tisinger et al. |
| 5,508,903 | A | 4/1996 | Alexndrov |
| 5,523,673 | A | 6/1996 | Ratliff et al. |
| 5,539,630 | A | 7/1996 | Pietkiewicz et al. |
| 5,554,561 | A | 9/1996 | Plumton |
| 5,555,494 | A | 9/1996 | Morris |
| 5,610,085 | A | 3/1997 | Yuan et al. |
| 5,624,860 | A | 4/1997 | Plumton et al. |
| 5,663,876 | A | 9/1997 | Newton et al. |
| 5,700,703 | A | 12/1997 | Huang et al. |
| 5,712,189 | A | 1/1998 | Plumton et al. |
| 5,719,544 | A | 2/1998 | Vinciarelli et al. |
| 5,734,564 | A | 3/1998 | Brkovic |
| 5,736,842 | A | 4/1998 | Jovanovic |
| 5,742,491 | A | 4/1998 | Bowman et al. |
| 5,747,842 | A | 5/1998 | Plumton |
| 5,756,375 | A | 5/1998 | Celii et al. |
| 5,760,671 | A | 6/1998 | Lahr et al. |
| 5,783,984 | A | 7/1998 | Keuneke |
| 5,784,266 | A | 7/1998 | Chen |
| 5,804,943 | A | 9/1998 | Kollman et al. |
| 5,815,383 | A | 9/1998 | Lei |
| 5,815,386 | A | 9/1998 | Gordon |
| 5,864,110 | A | 1/1999 | Moriguchi et al. |
| 5,870,299 | A | 2/1999 | Rozman |
| 5,880,942 | A | 3/1999 | Leu |
| 5,886,508 | A | 3/1999 | Jutras |
| 5,889,298 | A | 3/1999 | Plumton et al. |
| 5,889,660 | A | 3/1999 | Taranowski et al. |
| 5,900,822 | A | 5/1999 | Sand et al. |
| 5,907,481 | A | 5/1999 | Svärdsjö |
| 5,909,110 | A | 6/1999 | Yuan et al. |
| 5,910,665 | A | 6/1999 | Plumton et al. |
| 5,920,475 | A | 7/1999 | Boylan et al. |
| 5,925,088 | A | 7/1999 | Nasu |
| 5,929,665 | A | 7/1999 | Ichikawa et al. |
| 5,933,338 | A | 8/1999 | Wallace |
| 5,940,287 | A | 8/1999 | Brkovic |
| 5,946,207 | A | 8/1999 | Schoofs |
| 5,956,245 | A | 9/1999 | Rozman |
| 5,956,578 | A | 9/1999 | Weitzel et al. |
| 5,959,850 | A | 9/1999 | Lim |
| 5,977,853 | A | 11/1999 | Ooi et al. |
| 5,999,066 | A | 12/1999 | Saito et al. |
| 5,999,429 | A | 12/1999 | Brown |
| 6,003,139 | A | 12/1999 | McKenzie |
| 6,008,519 | A | 12/1999 | Yuan et al. |
| 6,011,703 | A | 1/2000 | Boylan et al. |
| 6,038,154 | A | 3/2000 | Boylan et al. |
| 6,046,664 | A | 4/2000 | Weller et al. |
| 6,055,166 | A | 4/2000 | Jacobs et al. |
| 6,060,943 | A | 5/2000 | Jansen |
| 6,067,237 | A | 5/2000 | Nguyen |
| 6,069,798 | A | 5/2000 | Liu |
| 6,069,799 | A | 5/2000 | Bowman et al. |
| 6,078,510 | A | 6/2000 | Spampinato et al. |
| 6,084,792 | A | 7/2000 | Chen et al. |
| 6,094,038 | A | 7/2000 | Lethellier |
| 6,097,046 | A | 8/2000 | Plumton |
| 6,125,046 | A | 9/2000 | Jang et al. |
| 6,144,187 | A | 11/2000 | Bryson |
| 6,147,886 | A | 11/2000 | Wittenbreder |
| 6,156,611 | A | 12/2000 | Lan et al. |
| 6,160,721 | A * | 12/2000 | Kossives et al. ................. 363/15 |
| 6,163,466 | A | 12/2000 | Davila, Jr. et al. |
| 6,181,231 | B1 | 1/2001 | Bartilson |
| 6,188,586 | B1 | 2/2001 | Farrington et al. |
| 6,191,964 | B1 | 2/2001 | Boylan et al. |
| 6,208,535 | B1 | 3/2001 | Parks |
| 6,215,290 | B1 | 4/2001 | Yang et al. |
| 6,218,891 | B1 | 4/2001 | Lotfi et al. |
| 6,229,197 | B1 | 5/2001 | Plumton et al. |
| 6,262,564 | B1 | 7/2001 | Kanamori |
| 6,288,501 | B1 | 9/2001 | Nakamura et al. |
| 6,288,920 | B1 | 9/2001 | Jacobs et al. |
| 6,295,217 | B1 | 9/2001 | Yang et al. |
| 6,304,460 | B1* | 10/2001 | Cuk ................................ 363/16 |
| 6,309,918 | B1 | 10/2001 | Huang et al. |
| 6,317,021 | B1 | 11/2001 | Jansen |
| 6,317,337 | B1* | 11/2001 | Yasumura ................. 363/21.04 |
| 6,320,490 | B1 | 11/2001 | Clayton |
| 6,323,090 | B1 | 11/2001 | Zommer |
| 6,325,035 | B1 | 12/2001 | Codina et al. |
| 6,344,986 | B1 | 2/2002 | Jain et al. |
| 6,345,364 | B1 | 2/2002 | Lee |
| 6,348,848 | B1 | 2/2002 | Herbert |
| 6,351,396 | B1 | 2/2002 | Jacobs |
| 6,356,462 | B1 | 3/2002 | Jang et al. |
| 6,362,986 | B1 | 3/2002 | Schultz et al. |
| 6,373,727 | B1 | 4/2002 | Hedenskog et al. |
| 6,373,734 | B1 | 4/2002 | Martinelli |

| Patent | Type | Date | Inventor |
|---|---|---|---|
| 6,380,836 | B2 | 4/2002 | Matsumoto et al. |
| 6,388,898 | B1 | 5/2002 | Fan et al. |
| 6,392,902 | B1 | 5/2002 | Jang et al. |
| 6,400,579 | B2 | 6/2002 | Cuk |
| 6,414,578 | B1 | 7/2002 | Jitaru |
| 6,438,009 | B2 | 8/2002 | Assow |
| 6,462,965 | B1 | 10/2002 | Uesono |
| 6,466,461 | B2 | 10/2002 | Mao et al. |
| 6,469,564 | B1 | 10/2002 | Jansen |
| 6,477,065 | B2 | 11/2002 | Parks |
| 6,483,724 | B1 | 11/2002 | Blair et al. |
| 6,489,754 | B2 | 12/2002 | Blom |
| 6,498,367 | B1 | 12/2002 | Chang et al. |
| 6,501,193 | B1 | 12/2002 | Krugly |
| 6,504,321 | B2 | 1/2003 | Giannopoulos et al. |
| 6,512,352 | B2 | 1/2003 | Qian |
| 6,525,603 | B1 | 2/2003 | Morgan |
| 6,539,299 | B2 | 3/2003 | Chatfield et al. |
| 6,545,453 | B2 | 4/2003 | Glinkowski et al. |
| 6,548,992 | B1 | 4/2003 | Alcantar et al. |
| 6,549,436 | B1 | 4/2003 | Sun |
| 6,552,917 | B1 | 4/2003 | Bourdillon |
| 6,563,725 | B2 | 5/2003 | Carsten |
| 6,570,268 | B1 | 5/2003 | Perry et al. |
| 6,580,627 | B2 | 6/2003 | Toshio |
| 6,597,592 | B2 | 7/2003 | Carsten |
| 6,608,768 | B2 | 8/2003 | Sula |
| 6,611,132 | B2 | 8/2003 | Nakagawa et al. |
| 6,614,206 | B1 | 9/2003 | Wong et al. |
| 6,654,259 | B2 | 11/2003 | Koshita et al. |
| 6,661,276 | B1 | 12/2003 | Chang |
| 6,668,296 | B1 | 12/2003 | Dougherty et al. |
| 6,674,658 | B2 | 1/2004 | Mao et al. |
| 6,683,797 | B2 | 1/2004 | Zaitsu et al. |
| 6,687,137 | B1 * | 2/2004 | Yasumura .................. 363/21.01 |
| 6,696,910 | B2 | 2/2004 | Nuytkens et al. |
| 6,731,486 | B2 | 5/2004 | Holt et al. |
| 6,741,099 | B1 | 5/2004 | Krugly |
| 6,753,723 | B2 | 6/2004 | Zhang |
| 6,765,810 | B2 | 7/2004 | Perry |
| 6,775,159 | B2 | 8/2004 | Webb et al. |
| 6,784,644 | B2 | 8/2004 | Xu et al. |
| 6,804,125 | B2 | 10/2004 | Brkovic |
| 6,813,170 | B2 | 11/2004 | Yang |
| 6,831,847 | B2 | 12/2004 | Perry |
| 6,856,149 | B2 | 2/2005 | Yang |
| 6,862,194 | B2 | 3/2005 | Yang et al. |
| 6,867,678 | B2 | 3/2005 | Yang |
| 6,867,986 | B2 | 3/2005 | Amei |
| 6,873,237 | B2 | 3/2005 | Chandrasekaran et al. |
| 6,882,548 | B1 | 4/2005 | Jacobs et al. |
| 6,906,934 | B2 | 6/2005 | Yang et al. |
| 6,943,553 | B2 | 9/2005 | Zimmerman et al. |
| 6,944,033 | B1 | 9/2005 | Xu et al. |
| 6,977,824 | B1 | 12/2005 | Yang et al. |
| 6,980,077 | B1 | 12/2005 | Chandrasekaran et al. |
| 6,982,887 | B2 | 1/2006 | Batarseh et al. |
| 7,009,486 | B1 | 3/2006 | Goeke et al. |
| 7,012,414 | B1 | 3/2006 | Mehrotra et al. |
| 7,016,204 | B2 | 3/2006 | Yang et al. |
| 7,026,807 | B2 | 4/2006 | Anderson et al. |
| 7,034,586 | B2 | 4/2006 | Mehas et al. |
| 7,034,647 | B2 | 4/2006 | Yan et al. |
| 7,046,523 | B2 | 5/2006 | Sun et al. |
| 7,061,358 | B1 | 6/2006 | Yang |
| 7,076,360 | B1 | 7/2006 | Ma |
| 7,095,638 | B2 | 8/2006 | Uusitalo |
| 7,098,640 | B2 | 8/2006 | Brown |
| 7,099,163 | B1 | 8/2006 | Ying |
| 7,136,293 | B2 | 11/2006 | Petkov et al. |
| 7,148,669 | B2 | 12/2006 | Maksimovic et al. |
| 7,170,268 | B2 | 1/2007 | Kim |
| 7,176,662 | B2 | 2/2007 | Chandrasekaran |
| 7,209,024 | B2 | 4/2007 | Nakahori |
| 7,269,038 | B2 | 9/2007 | Shekhawat et al. |
| 7,280,026 | B2 | 10/2007 | Chandrasekaran et al. |
| 7,285,807 | B2 | 10/2007 | Brar et al. |
| 7,298,118 | B2 | 11/2007 | Chandrasekaran |
| 7,301,785 | B2 * | 11/2007 | Yasumura .................. 363/21.02 |
| 7,312,686 | B2 | 12/2007 | Bruno |
| 7,321,283 | B2 | 1/2008 | Mehrotra et al. |
| 7,332,992 | B2 | 2/2008 | Iwai |
| 7,339,208 | B2 | 3/2008 | Brar et al. |
| 7,339,801 | B2 * | 3/2008 | Yasumura .................. 363/21.02 |
| 7,348,612 | B2 | 3/2008 | Sriram et al. |
| 7,360,004 | B2 | 4/2008 | Dougherty et al. |
| 7,362,592 | B2 | 4/2008 | Yang et al. |
| 7,362,593 | B2 | 4/2008 | Yang et al. |
| 7,375,607 | B2 | 5/2008 | Lee et al. |
| 7,385,375 | B2 | 6/2008 | Rozman |
| 7,386,404 | B2 | 6/2008 | Cargonja et al. |
| 7,417,875 | B2 | 8/2008 | Chandrasekaran et al. |
| 7,427,910 | B2 | 9/2008 | Mehrotra et al. |
| 7,446,512 | B2 * | 11/2008 | Nishihara et al. ............. 323/233 |
| 7,447,049 | B2 * | 11/2008 | Garner et al. ............. 363/21.12 |
| 7,468,649 | B2 | 12/2008 | Chandrasekaran |
| 7,471,523 | B2 * | 12/2008 | Yang .......................... 363/21.13 |
| 7,489,225 | B2 | 2/2009 | Dadafshar |
| 7,499,295 | B2 * | 3/2009 | Indika de Silva et al. . 363/21.18 |
| 7,554,430 | B2 | 6/2009 | Mehrotra et al. |
| 7,558,037 | B1 | 7/2009 | Gong et al. |
| 7,558,082 | B2 | 7/2009 | Jitaru |
| 7,567,445 | B2 * | 7/2009 | Coulson et al. ............. 363/21.12 |
| 7,630,219 | B2 | 12/2009 | Lee |
| 7,633,369 | B2 | 12/2009 | Chandrasekaran et al. |
| 7,663,183 | B2 | 2/2010 | Brar et al. |
| 7,667,986 | B2 | 2/2010 | Artusi et al. |
| 7,675,758 | B2 | 3/2010 | Artusi et al. |
| 7,675,759 | B2 | 3/2010 | Artusi et al. |
| 7,675,764 | B2 | 3/2010 | Chandrasekaran et al. |
| 7,715,217 | B2 | 5/2010 | Manabe et al. |
| 7,733,679 | B2 | 6/2010 | Luger et al. |
| 7,746,041 | B2 | 6/2010 | Xu et al. |
| 7,778,050 | B2 | 8/2010 | Yamashita |
| 7,778,051 | B2 | 8/2010 | Yang |
| 7,787,264 | B2 | 8/2010 | Yang et al. |
| 7,791,903 | B2 | 9/2010 | Zhang et al. |
| 7,795,849 | B2 | 9/2010 | Sohma |
| 7,813,101 | B2 | 10/2010 | Morikawa |
| 7,847,535 | B2 | 12/2010 | Meynard et al. |
| 7,889,517 | B2 | 2/2011 | Artusi et al. |
| 7,889,521 | B2 | 2/2011 | Hsu |
| 7,906,941 | B2 | 3/2011 | Jayaraman et al. |
| 7,940,035 | B2 | 5/2011 | Yang |
| 7,965,528 | B2 * | 6/2011 | Yang et al. ...................... 363/95 |
| 7,983,063 | B2 | 7/2011 | Lu et al. |
| 8,004,112 | B2 | 8/2011 | Koga et al. |
| 8,179,699 | B2 | 5/2012 | Tumminaro et al. |
| 2002/0057080 | A1 | 5/2002 | Telefus et al. |
| 2002/0114172 | A1 | 8/2002 | Webb et al. |
| 2003/0026115 | A1 | 2/2003 | Miyazaki |
| 2003/0197585 | A1 | 10/2003 | Chandrasekaran et al. |
| 2003/0198067 | A1 | 10/2003 | Sun et al. |
| 2004/0017689 | A1 | 1/2004 | Zhang et al. |
| 2004/0034555 | A1 | 2/2004 | Dismukes et al. |
| 2004/0148047 | A1 | 7/2004 | Dismukes et al. |
| 2004/0156220 | A1 | 8/2004 | Kim et al. |
| 2004/0200631 | A1 | 10/2004 | Chen |
| 2004/0217794 | A1 | 11/2004 | Strysko |
| 2005/0024179 | A1 | 2/2005 | Chandrasekaran et al. |
| 2005/0245658 | A1 | 11/2005 | Mehrotra et al. |
| 2005/0281058 | A1 | 12/2005 | Batarseh et al. |
| 2006/0038549 | A1 | 2/2006 | Mehrotra et al. |
| 2006/0038649 | A1 | 2/2006 | Mehrotra et al. |
| 2006/0038650 | A1 | 2/2006 | Mehrotra et al. |
| 2006/0109698 | A1 | 5/2006 | Qu |
| 2006/0187684 | A1 | 8/2006 | Chandrasekaran et al. |
| 2006/0197510 | A1 | 9/2006 | Chandrasekaran |
| 2006/0198173 | A1 | 9/2006 | Rozman |
| 2006/0226477 | A1 | 10/2006 | Brar et al. |
| 2006/0226478 | A1 | 10/2006 | Brar et al. |
| 2006/0237968 | A1 | 10/2006 | Chandrasekaran |
| 2006/0255360 | A1 | 11/2006 | Brar et al. |
| 2007/0007945 | A1 | 1/2007 | King et al. |
| 2007/0045765 | A1 | 3/2007 | Brar et al. |
| 2007/0069286 | A1 | 3/2007 | Brar et al. |
| 2007/0114979 | A1 | 5/2007 | Chandrasekaran |
| 2007/0222463 | A1 | 9/2007 | Qahouq et al. |

| | | | |
|---|---|---|---|
| 2007/0241721 A1 | 10/2007 | Weinstein et al. | |
| 2007/0296028 A1 | 12/2007 | Brar et al. | |
| 2007/0298559 A1 | 12/2007 | Brar et al. | |
| 2007/0298564 A1 | 12/2007 | Brar et al. | |
| 2008/0024259 A1 | 1/2008 | Chandrasekaran et al. | |
| 2008/0054874 A1 | 3/2008 | Chandrasekaran et al. | |
| 2008/0111657 A1 | 5/2008 | Mehrotra et al. | |
| 2008/0130321 A1 | 6/2008 | Artusi et al. | |
| 2008/0130322 A1 | 6/2008 | Artusi et al. | |
| 2008/0137381 A1 | 6/2008 | Beasley | |
| 2008/0150666 A1 | 6/2008 | Chandrasekaran et al. | |
| 2008/0205104 A1 | 8/2008 | Lev et al. | |
| 2008/0224812 A1 | 9/2008 | Chandrasekaran | |
| 2008/0232141 A1 | 9/2008 | Artusi et al. | |
| 2008/0298106 A1 | 12/2008 | Tataeishi | |
| 2008/0310190 A1 | 12/2008 | Chandrasekaran et al. | |
| 2008/0315852 A1 | 12/2008 | Jayaraman et al. | |
| 2008/0316779 A1 | 12/2008 | Jayaraman et al. | |
| 2009/0097290 A1 | 4/2009 | Chandrasekaran | |
| 2009/0257250 A1 | 10/2009 | Liu | |
| 2009/0273957 A1 | 11/2009 | Feldtkeller | |
| 2009/0284994 A1 | 11/2009 | Lin et al. | |
| 2009/0315530 A1 | 12/2009 | Baranwal | |
| 2010/0091522 A1 | 4/2010 | Chandrasekaran et al. | |
| 2010/0123486 A1 | 5/2010 | Berghegger | |
| 2010/0149838 A1 | 6/2010 | Artusi et al. | |
| 2010/0182806 A1 | 7/2010 | Garrity et al. | |
| 2010/0188876 A1 | 7/2010 | Garrity et al. | |
| 2010/0254168 A1 | 10/2010 | Chandrasekaran | |
| 2010/0321964 A1 | 12/2010 | Brinlee et al. | |
| 2011/0038179 A1 | 2/2011 | Zhang | |
| 2011/0134664 A1 | 6/2011 | Berghegger | |
| 2011/0149607 A1 | 6/2011 | Jungreis et al. | |
| 2011/0182089 A1 | 7/2011 | Berghegger | |
| 2011/0239008 A1 | 9/2011 | Lam et al. | |
| 2011/0305047 A1 | 12/2011 | Jungreis et al. | |
| 2012/0243271 A1 | 9/2012 | Berghegger | |
| 2012/0294048 A1 | 11/2012 | Brinlee | |

FOREIGN PATENT DOCUMENTS

| | | | |
|---|---|---|---|
| EP | 0 665 634 A1 | 1/1994 | |
| JP | 57097361 A | 6/1982 | |
| JP | 3-215911 | 9/1991 | |
| JP | 2000-68132 | 3/2000 | |
| WO | WO8700991 | 2/1987 | |
| WO | WO 2010/083511 A1 | 7/2010 | |
| WO | WO 2010/083514 A1 | 7/2010 | |
| WO | WO 2010/114914 A1 | 10/2010 | |
| WO | WO 2011/116225 A1 | 9/2011 | |

OTHER PUBLICATIONS

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE 11th Annual Applied Power Electronics Conference and Exposition, Mar. 1996, pp. 264-269, vol. 1, IEEE.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002,'pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Kuwabara, K., et al., "Switched-Capacitor DC—DC Converters," Fujitsu Limited, IEEE, 1988 Kawasaki, Japan, pp. 213-218.

Maxim, Application Note 725, www.maxim-ic.com/an725, Maxim Integrated Products, Nov. 29, 2001, 8 pages.

National Semiconductor Corporation, "LM2665 Switched Capacitor Voltage Converter," www.national.com, Sep. 2005, 9 pages.

National Semiconductor Corporation, "LMC7660 Switched Capacitor Voltage Converter," www.national.com, Apr. 1997, 12 pages.

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

Texas Instruments Incorporated, "LT1054, LT1054Y Switched-Capacitor Voltage Converters With Regulators," SLVS033C, Feb. 1990—Revised Jul. 1998, 25 pages.

Vallamkonda, S., "Limitations of Switching Voltage Regulators," A Thesis in Electrical Engineering, Texas Tech University, May 2004, 89 pages.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

* cited by examiner

POWER CONVERTER EMPLOYING A VARIABLE SWITCHING FREQUENCY AND A MAGNETIC DEVICE WITH A NON-UNIFORM GAP

TECHNICAL FIELD

The present invention is directed, in general, to power electronics and, more specifically, to a power converter including a power switch, a controller for controlling a switching frequency thereof, and a magnetic device with a non-uniform gap.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of a power switch of the power converter. The duty cycle "D" is a ratio represented by a conduction period of a power switch to a switching period thereof. Thus, if a power switch conducts for half of the switching period, the duty cycle for the power switch would be 0.5 (or 50 percent). Additionally, as the voltage or the current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

Power converters designed to operate at low power levels typically employ a flyback power train topology to achieve low manufacturing cost. A power converter with a low power rating designed to convert an ac mains voltage to a regulated dc output voltage to power an electronic load such as a printer, modem, or personal computer is generally referred to as a "power adapter" or an "ac adapter." Some power adapters may be required to provide short-term peaks of power that are much greater than a nominal operating power level. A power adapter with a nominal 25 watt output power rating may be required to produce 60 watts of peak output power for a relatively small fraction of an operational cycle of the load, for example, for 40 milliseconds ("ms") out of a 240 millisecond operational cycle of the load.

A component of the magnetic flux in a magnetic device, such as a power transformer (also referred to as a "transformer"), in certain power train topologies employed in a power converter is proportional to a peak operating current in a primary winding thereof. Accordingly, the magnetic device in power adapters should be sized for the peak power, rather than the nominal output power rating. However, oversizing the magnetic device increases its cost, which is an important consideration for high volume markets such as the markets for printers, modems, and personal computers. Designing a power converter for peak power also increases power losses at lower power levels because the power converter is typically designed to enter a discontinuous conduction mode ("DCM") at a higher output power level than a power converter designed to operate only at a nominal output power level.

Power conversion efficiency of power adapters has become a significant marketing criterion, particularly since the publication of recent U.S. Energy Star specifications that require a power conversion efficiency of power adapters for personal computers to be at least 50 percent at output power levels below about one watt. The "One Watt Initiative" of the International Energy Agency is another energy saving initiative to reduce appliance standby power to one watt or less. These efficiency requirements at very low output power levels were established in view of the typical load presented by a printer in an idle or sleep mode, which is an operational state for a large fraction of the time for such devices in a home or office environment. A challenge for a power adapter designer is to provide a high level of power conversion efficiency over a wide range of output power.

Numerous strategies have been developed to reduce manufacturing costs and increase power conversion efficiency of power adapters over a wide range of output power levels including the incorporation of a burst operating mode at very low output power levels, the inclusion of an energy-recovery snubber circuit or a custom integrated controller, and a carefully tailored specification. Each of these approaches, however, provides a cost or efficiency limitation that often fails to distinguish a particular vendor in the marketplace. Accordingly, what is needed in the art is a design approach for a power adapter that enables a further reduction in manufacturing cost and improvement in power conversion efficiency that does not compromise end-product performance, and that can be advantageously adapted to high-volume manufacturing techniques. Additionally, what is needed in the art is a magnetic device employable with a power adapter or the like that enables the magnetizing inductance of the magnetic device to increase at lower current levels.

SUMMARY OF THE INVENTION

These and other problems are generally solved or circumvented, and technical advantages are generally achieved, by advantageous embodiments of the present invention, including a power converter including a power switch, a controller for controlling a switching frequency thereof, and a magnetic device with a non-uniform gap. In one embodiment, the power converter includes a power switch and a magnetic device coupled to the power switch and having a non-uniform gap. The power converter also includes a controller having a detector configured to sense a condition representing an output power of the power converter. A control circuit of the controller is configured to control a switching frequency of the power switch as a function of the condition and control a duty cycle of the power switch to regulate an output characteristic of the power converter.

In another aspect, the present invention provides a magnetic device with a non-uniform gap including a magnetic core having first and second core sections, wherein the second core section of the magnetic core has a leg that forms a gap with the first core section of the magnetic core. An end of the leg of the second core section of the magnetic core may have a reduced cross-sectional area or a hole bored therein to form the non-uniform gap. Alternatively, the leg of the second core section of the magnetic cores may have a core piecepart positioned at an end thereof or a tapered region at an end thereof to form the non-uniform gap. In an alternative embodiment, the magnetic device may include another magnetic core having first and second core sections, wherein the second core section of the another magnetic core has a leg that forms a gap with the first core section thereof. The gaps of the two magnetic cores to form a non-uniform gap for the magnetic device.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Figure 1:
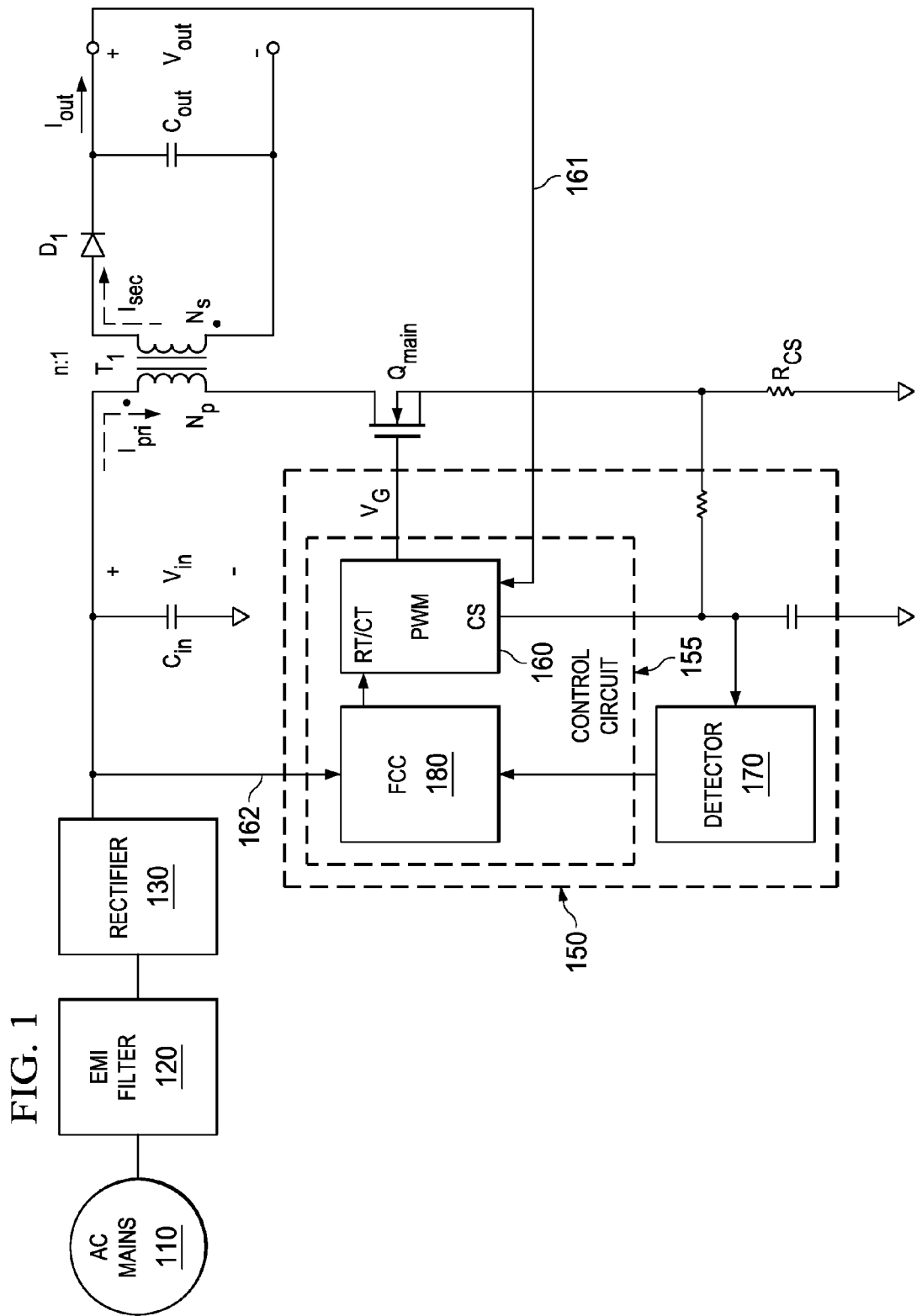
FIG. 1 illustrates a schematic diagram of an embodiment of a power adapter employing power converter constructed according to the principles of the present invention.

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a power switch, a controller for controlling a switching frequency thereof, and a magnetic device with a non-uniform gap. While the principles of the present invention will be described in the environment of a power converter, any application that may benefit from a power conversion device including a power switch, a controller and a magnetic device such as a power amplifier or a motor controller is well within the broad scope of the present invention.

A flyback power converter is often employed in low power applications such as a power adapter for a printer because of its simplicity and low cost. Power adapters employing a flyback power converter are typically designed to operate continuously at a high output power level. However, the loads presented to power adapters such as loads provided by printers and personal computers are generally variable, and usually do not operate for an extended period of time at a maximum power level. A consideration for the design of power adapters for these applications is power conversion efficiency at light and moderate loads.

A flyback power converter is conventionally designed to operate at a substantially constant switching frequency. Other power converter topologies are designed to operate with a switching frequency that decreases as the load increases. To reduce electromagnetic interference ("EMI"), the switching frequency may be modulated, typically in a random manner, to produce small frequency deviations around a nominal switching frequency. The random variation of the switching frequency spreads the spectrum of the electromagnetic interference frequency components and reduces its peak spectral values. The reduced peak spectral values can provide a significant reduction in added components to manage the electromagnetic interference produced by the switching action of the power train of the power converter. However, the effect of these small frequency deviations on the design of principal elements of the power train such as the magnetic device (e.g., transformer) and the power switch as well as power conversion efficiency is generally insubstantial.

As introduced herein, as the output power supplied by the power converter to the load increases, the switching frequency of the switch(es) of the power converter is increased. The increased switching frequency decreases the peak current through a magnetic device employed in the power train topology, particularly in a flyback power train topology. Correspondingly, the peak flux in a magnetic device is reduced. The ripple current in a filter component of the power converter such as an output inductor may also be reduced. The size of the magnetic device such as the transformer may be advantageously reduced. As a result, the power converter not only can use a smaller transformer, but the power converter can also maintain operation in a continuous conduction mode ("CCM") at a lower power level, enabling increased power conversion efficiency at a lower power level. The technique of controlling (e.g., varying) the switching frequency as a function of a condition representing an output power of the power converter (e.g., a sensed current or a sensed output power level) can be used to reduce the switching frequency of the switch(es) of the power converter over most or all of the load range as the output power is reduced to further increase power conversion efficiency at lower power levels. During lower power operation, reduction of the switching frequency reduces switching losses that become a smaller percentage of the total power converter losses. The reduction in switching frequency thus increases power conversion efficiency during lower power operation.

The switching frequency may be controlled to be proportional to the output power of the power converter and in accordance with a selected input voltage thereof. Advantageously, a lower switching frequency limit such as 20 kilohertz ("kHz") may be employed to prevent operation within a range of human hearing. At a very low output power level such as one percent or less of maximum rated output power, a burst mode of operation may also be employed to control the power converter. In a burst mode of operation, the switching action of the switch(es) of the power train of the power converter is temporarily stopped while an output filter capacitor supplies power to the load. After the output filter capacitor is partially (or only slightly) discharged, the switching action of the power train is resumed. Thus, the switching frequency may be controlled to be proportional to the output power of the power converter during a non-burst mode of operation thereof.

The process of increasing and decreasing switching frequency parallel to increased and decreased load on the power converter may be applied to a power train topology wherein a peak magnetic flux in a magnetic device is dependent on the load on the power converter. For example, the process of controlling switching frequency with a condition representing an output power of the power converter may be applied to a buck or to a boost power train topology, including isolated and nonisolated topology variants such as a power-factor controlled boost power train topology.

Turning now to FIG. 1, illustrated is a schematic diagram of an embodiment of a power adapter employing power converter with a controller 150 constructed according to the principles of the present invention. A power train (e.g., a flyback power train) of the power converter (also referred to as a "flyback power converter") includes a power switch $Q_{main}$ coupled to an ac mains 110, an electromagnetic interference ("EMI") filter 120, a bridge rectifier 130 and an input filter capacitor $C_{in}$ to provide a dc input voltage $V_{in}$ to a magnetic device (e.g., an isolating transformer or transformer $T_1$). The transformer $T_1$ has a primary winding $N_p$ and a secondary winding $N_s$ with a turns ratio n:1 that is selected to provide an output voltage $V_{out}$ with consideration of a resulting duty cycle and stress on power train components. The transformer $T_1$ may also include a non-uniform gap as described below.

The power switch $Q_{main}$ (e.g., an n-channel field-effect transistor) is controlled by a pulse-width modulator ("PWM") 160 that controls the power switch $Q_{main}$ to be conducting for a duty cycle. The power switch $Q_{main}$ conducts in response to gate drive signal $V_G$ produced by a pulse-width modulator 160 of a control circuit 155 with a switching frequency (often designated as "$f_s$"). The duty cycle is controlled (e.g., adjusted) by the pulse-width modulator 160 to regulate an output characteristic of the power converter such as an output voltage $V_{out}$, an output current $I_{out}$, or a combination of the two. A feedback path 161 enables the pulse-width modulator 160 to control the duty cycle to regulate the output characteristic of the power converter. Of course, as is well known in the art, a circuit isolation element such as an opto-isolator may be employed in the feedback path 161 to maintain input-output isolation of the power converter.

The ac voltage appearing on the secondary winding $N_s$ of the transformer $T_1$ is rectified by the diode $D_1$, and the dc component of the resulting waveform is coupled to the output through the low-pass output filter including an output filter capacitor $C_{out}$ to produce the output voltage $V_{out}$. A detector 170 senses a condition representing an output power of the power converter (e.g., a current in a current-sensing resistor $R_{CS}$) and a frequency control circuit ("FCC") 180 of the control circuit 155 is configured to control (e.g., modify, alter, vary, etc.) the switching frequency of the power switch $Q_{main}$ of the power converter in response to the sensed current as described further hereinbelow. The control circuit 155 may control the switching frequency of the power switch $Q_{main}$ during a non burst mode of operation of the power converter and in accordance with a selected input voltage $V_{in}$ or voltage range thereof. A feed-forward signal path 162 may be present to provide a voltage signal to the frequency control circuit 180 to enable feed-forward frequency control of the power converter based on the input voltage $V_{in}$ thereto. For example, at a high-line input voltage $V_{in}$ (e.g., 230VAC) the peak current in the power switch $Q_{main}$ will be lower than at a low-line input voltage $V_{in}$ (e.g., 115VAC) for a given output power level. The feed-forward signal path 162 may be used to compensate for the changes in the output of the detector 170 as a result of changes to the input voltage $V_{in}$. At the high-line input voltage $V_{in}$, the switching frequency of the power switch $Q_{main}$ may be reduced. For instance, at the high-line input voltage $V_{in}$, the switching frequency of the power switch $Q_{main}$ may be linearly reduced as a function of the input voltage $V_{in}$.

During a first portion of the duty cycle, a current $I_{pri}$ (e.g., an inductor current) flowing through the primary winding $N_p$ of the transformer $T_1$ increases as current flows from the input through the power switch $Q_{main}$. During a complementary portion of the duty cycle (generally co-existent with a complementary duty cycle 1-D of the power switch $Q_{main}$), the power switch $Q_{main}$ is transitioned to a non-conducting state. Residual magnetic energy stored in the transformer $T_1$ causes conduction of current through the diode $D_1$ when the power switch $Q_{main}$ is off. The diode $D_1$, which is coupled to the output filter capacitor $C_{out}$, provides a path to maintain continuity of a magnetizing current of the transformer $T_1$. During the complementary portion of the duty cycle, the magnetizing current flowing through the secondary winding $N_s$ of the transformer $T_1$ decreases. In general, the duty cycle of the power switch $Q_{main}$ may be controlled (e.g., adjusted) to maintain a regulation of or regulate the output voltage $V_{out}$ of the power converter.

In order to regulate the output voltage $V_{out}$, a value or a scaled value of the output voltage $V_{out}$ is typically compared with a reference voltage in the pulse-width modulator 160 using an error amplifier (not shown) to control the duty cycle. This forms a negative feedback arrangement to regulate the output voltage $V_{out}$ to a (scaled) value of the reference voltage. A larger duty cycle implies that the power switch $Q_{main}$ is closed for a longer fraction of the switching period of the power converter.

The energy storage inductor of the flyback power train is incorporated into the transformer $T_1$ as the magnetizing inductance of transformer $T_1$. In order to provide the power conversion at high efficiency, the power converter operates in a continuous conduction mode at low-line input voltage. In the continuous conduction mode, the current flowing through the power switch $Q_{main}$ starts at a positive value when the power switch $Q_{main}$ first turns on (i.e., closed or conducting). While the power switch $Q_{main}$ is off (i.e., open or non-conducting) and while the diode $D_1$ is on, the current through the diode $D_1$ does not decrease to zero. An active power switch such as a field-effect transistor may be substituted for the diode $D_1$ as a synchronous rectifier to improve power conversion efficiency.

Figure 2:
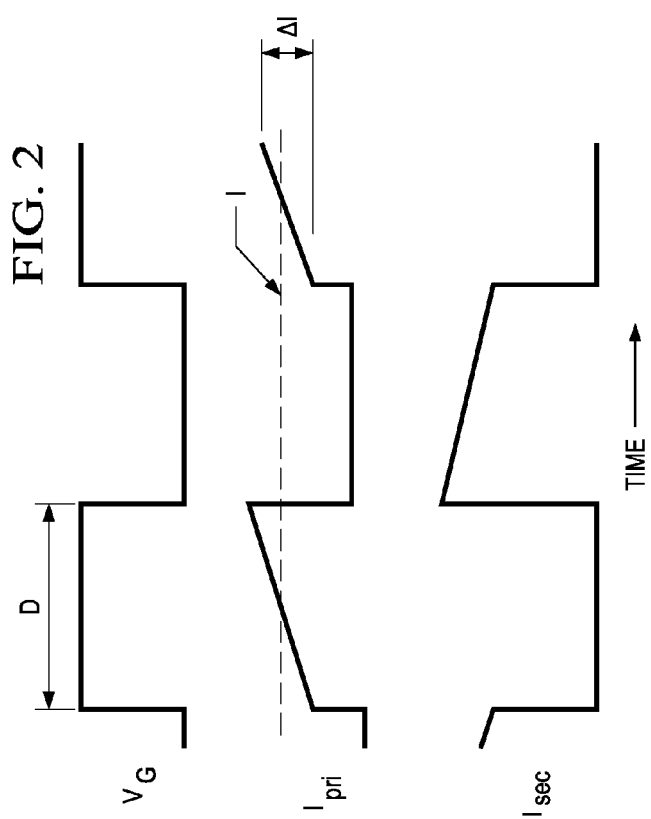
FIG. 2 illustrates waveforms of a voltage and a current versus time for an exemplary power converter operable in a continuous conduction mode according to the principles of the present invention.

Turning now to FIG. 2, illustrated are waveforms of a voltage and a current versus time for an exemplary power converter operable in a continuous conduction mode according to the principles of the present invention. With continuing reference to the power converter of FIG. 1, the aforementioned characteristics relate to the gate drive signal $V_G$ for the power switch $Q_{main}$, the current $I_{pri}$ in the primary winding $N_p$ of the transformer $T_1$, and the current $I_{sec}$ in the secondary winding $N_s$ of the transformer $T_1$. The parameter "D" represents the first portion of the duty cycle. The average current in the primary winding $N_p$ of the transformer $T_1$ during the first portion of the duty cycle is represented in FIG. 2 by the parameter "I." The change in the current in the primary winding $N_p$ of the transformer $T_1$ during the first portion of the duty cycle, is represented by the parameter "ΔI."

The output voltage $V_{out}$ of a flyback power converter in a continuous conduction mode can be represented approximately by equation (1):

$$V_{out}=V_{in}\cdot[D/(1-D)]\cdot(1/n),$$

where D is the duty cycle of the power switch $Q_{main}$ (i.e., the fraction of time during which the power switch $Q_{main}$ is on, closed or conducting), and "n" is the ratio of the number of turns in the primary winding $N_p$ of the transformer $T_1$ to the number of turns in the secondary winding $N_s$. Thus, when operating in the continuous conduction mode, the duty cycle of the power converter is determined by the ratio of input voltage $V_{in}$ to the output voltage $V_{out}$. Also, when operating in the continuous conduction mode, the output power of the power converter determines the output current $I_{out}$ and, therefore, the output power is controlled by the transformer $T_1$ turns ratio. For a given transformer $T_1$ turns ratio n:1 (which is limited by the voltage rating of the power switch $Q_{main}$ and the need to operate at reasonably high duty cycles to obtain high power conversion efficiency), the average value of the current in the power switch $Q_{main}$ is determined by the load. The average value of the current in the power switch $Q_{main}$ is independent of the switching frequency.

A conventional way of operating a flyback power converter, particularly in power adapters, is to use a substantially constant switching frequency. At very light load, as indicated previously above, a power converter may operate in a burst mode of operation wherein the power converter is intermittently disabled to reduce light- or no-load power consumption. As introduced herein, a controller 150 monitors a condition representing an output power of the power converter (e.g., a sensed current such as a sensed peak current through a current-sensing resistor $R_{cs}$ or other current-sensing element such as a current-sensing transformer) to control the switching frequency of the power converter. Alternatively, the controller 150 may monitor other conditions representing an output power of the power converter such as a current in another power train component (e.g., a secondary-side component) to control the switching frequency of the power converter. As the peak current in the current-sensing resistor $R_{CS}$ (or other current-sensing element) illustrated in FIGS. 1 and 3 increases, the power converter switching frequency is increased. For example, the power converter switching frequency may be increased from 20 kHz at a low output power level to 130 kHz at a maximum output power level. A lower limit on the power converter switching frequency may be required, as indicated previously, to prevent operation within the frequency range of human hearing.

Figure 3:
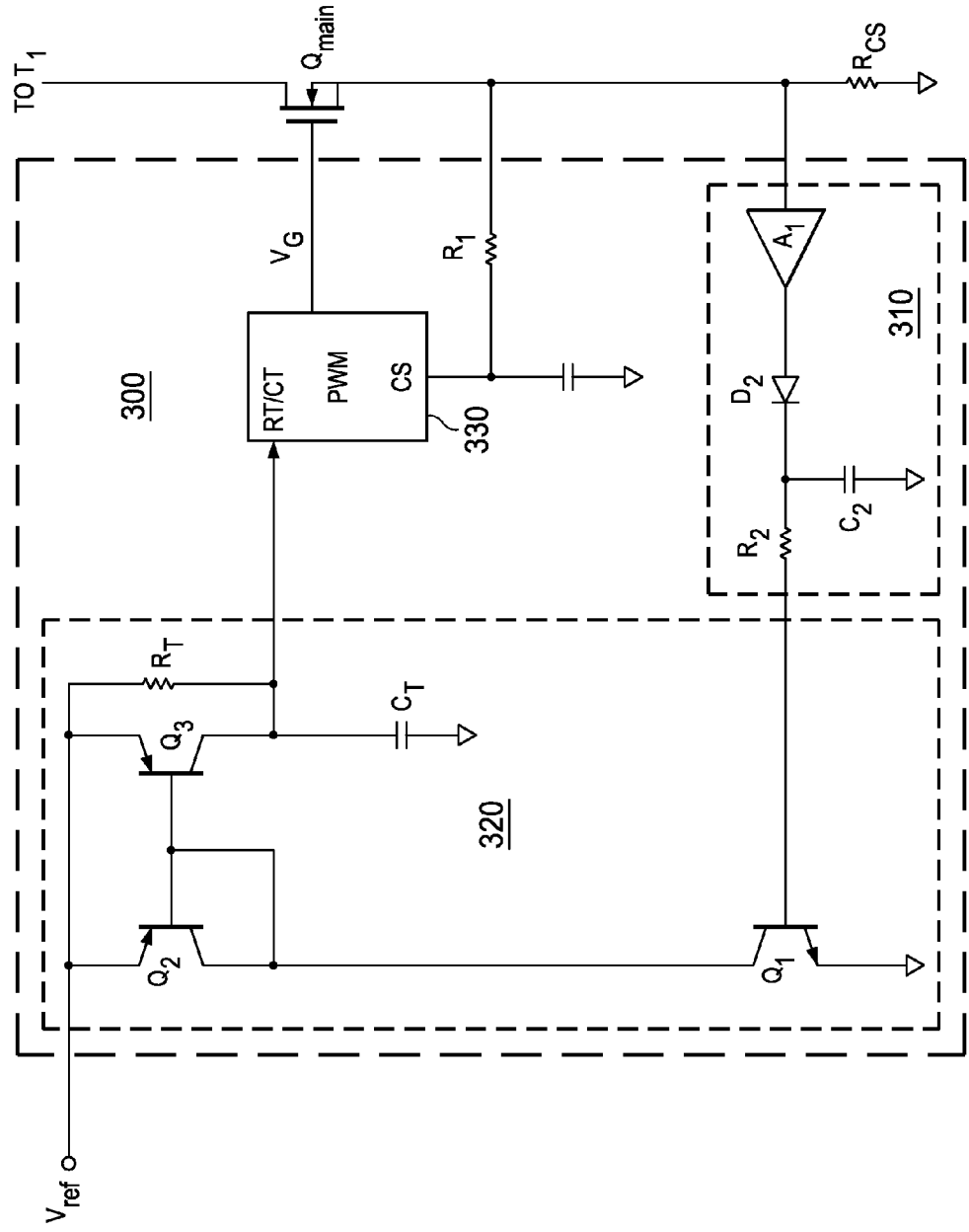
FIG. 3 illustrates a schematic diagram of an embodiment of a controller configured to control a switching frequency of a power converter constructed according to the principles of the present invention.

Turning now to FIG. 3, illustrated is a schematic diagram of an embodiment of a controller 300 configured to control a switching frequency of a power converter constructed according to the principles of the present invention. The controller 300 may be employed in the flyback power converter illustrated in FIG. 1 to control (e.g., increase) the switching frequency of the power converter as the peak current through the power switch $Q_{main}$ changes (e.g., increases). A timing capacitor $C_T$ and a timing resistor $R_T$ coupled to an RT/CT input (that controls an oscillator frequency) of a pulse-width modulator 330 is set to a nominal switching frequency of the power converter. The power converter includes a current-sensing resistor $R_{CS}$ coupled in series with the source terminal of the power switch $Q_{main}$.

A detector 310 formed with a diode $D_2$ and a capacitor $C_2$ coupled to the current-sensing resistor $R_{CS}$ detects a condition representing an output power of the power converter (e.g., a peak current flowing through the power switch $Q_{main}$) producing a voltage across the capacitor $C_2$ that is substantially proportional to the peak current in the current-sensing resistor $R_{CS}$. An amplifier $A_1$ may optionally be included in accordance with the detector 310 of the controller 300 to increase a voltage sensed across the current-sensing resistor $R_{CS}$ to a higher level. The voltage produced across the capacitor $C_2$ in conjunction with the resistor $R_2$ of the detector 310 produces a base current for an amplifier (e.g., a bipolar transistor) $Q_1$, which in turn produces a collector current for the bipolar transistor $Q_1$. Of course, in an alternative embodiment, a field-effect transistor may be substituted for the bipolar transistor $Q_1$ with appropriate circuit modifications. The collector current in the bipolar transistor $Q_1$ flows through a current mirror formed with transistors $Q_2$, $Q_3$. The current-mirror current is coupled to the timing capacitor $C_T$ to control (e.g., increase) the switching frequency of the power converter as the peak current changes (e.g., increases) in the current-sensing resistor $R_{CS}$. A frequency control circuit 320 of the controller 300 includes the timing capacitor $C_T$, the timing resistor $R_T$, the bipolar transistor $Q_1$ and the current mirror. Thus, a control circuit including the frequency control circuit 320 and pulse-width modulator 330 is responsive to the detector 310 to control a switching frequency of the power switch(es) as well as control a duty cycle of the power switch $Q_{main}$ to regulate an output characteristic of the power converter. The control circuit of the controller 300 illustrated in FIG. 3 is configured to provide a continuous change in switching frequency as a function of a change of the peak switch current. A lower limit on the switching frequency is provided by the timing resistor $R_T$ corresponding to the case when no current is produced by the current mirror.

Power transferred from the input to the output of the power converter is dependent on a change in energy storage in the transformer $T_1$ during each switching cycle multiplied by the switching frequency. The power transferred to the output of the power converter can be represented by equation (2):

$$P=f_s\cdot[0.5\cdot L\cdot|(I+\Delta I)^2-(I-\Delta I)^2|]=f_s\cdot L\cdot I\cdot\Delta I,$$

where P is the output power of the power converter, $f_s$ is the power converter switching frequency, L is the magnetizing inductance of the transformer $T_1$ referenced to its primary winding $N_p$, $\Delta I$, as indicated previously above, is the change in the current in the primary winding $N_p$ of the transformer $T_1$ during the first portion of the duty cycle as illustrated in FIG. 2, and I is the average value of the current $I_{pri}$ flowing each cycle through the primary winding $N_p$ of the transformer $T_1$ during the first portion of the duty cycle.

The average value I of the current $I_{pri}$ flowing through the primary winding $N_p$ of the transformer $T_1$ is also determined by the output power as a function of the turns ratio n:1 of the transformer $T_1$. Increasing the switching frequency while maintaining a constant output power level causes a decrease in the value of the change in current $\Delta I$. A peak flux density $B_{peak}$ in the transformer $T_1$ is proportional to the peak value of current as set forth in equation (3):

$$B_{peak}\propto I+\Delta I/2.$$

Therefore, decreasing the value of the change in current $\Delta I$ decreases the peak value of peak flux density B, which enables the use of a smaller transformer core. Switching losses including core losses in the transformer $T_1$ may be significantly increased during peak power operation due to the higher switching frequency. However, printer power adapters as well as power adapters coupled to other loads typically require only short bursts of high power. The overall effect of a brief increase in switching frequency on the power converter internal heating will generally be minimal.

A peak current may be employed as a determining factor in changing the switching frequency of a power converter. Since the peak current through the power switch $Q_{main}$ is proportional to a flux density in the transformer $T_1$, saturation of the transformer core may be advantageously prevented, regardless of input voltage $V_{in}$, output voltage $V_{out}$, or other operating condition of the power converter.

Reducing the switching frequency of a power converter as the load or output power decreases enables an improvement in power converter efficiency at light load. Thus, switching frequency may be altered over substantially the entire power range of the power converter, excepting a limitation imposed by a lower frequency limit. In an embodiment, the switching frequency may be substantially proportional to the output power level over an operating range of the power converter, with an optional lower limit on the switching frequency and in accordance with a selected input voltage $V_{in}$ of the power converter.

When designing a power adapter, a designer is typically interested either in increasing power conversion efficiency while holding cost substantially constant, or decreasing cost while holding a performance characteristic constant such as power conversion efficiency. The process introduced herein of increasing switching frequency at peak power to reduce core flux density in a magnetic device enables a decrease in cost by allowing a reduction in core size, while holding normal power performance characteristic substantially constant.

The process of increasing switching frequency at higher load levels can be employed to increase efficiency at lighter load levels while holding cost approximately constant. To accomplish this objective, a region of reduced core cross-sectional area can be employed in the magnetic device (e.g., transformer) core to produce effectively a variable in the magnetic path of the flux. During a burst of peak power, the region of the core with reduced cross-sectional area saturates, effectively lengthening the gap (e.g., forming a non-uniform gap as described below) and reducing the magnetizing inductance of the transformer. The slope (with respect to time) of the current will increase due to reduced transformer magnetizing inductance at high current/flux levels. However, the increase in switching frequency at high load levels reduces the period of time during which current rises, enabling a circuit designer to hold the value of the change in current ΔI more nearly constant by relating the increase in power converter switching frequency to the decreased magnetizing inductance of the transformer.

A gap in a transformer core may cause a significant power loss by causing a fringing flux to flow through nearby conductive windings. Conductive materials such as transformer windings formed around a transformer center leg should not be placed in the immediate vicinity of the gap. This reduces a fringing flux flowing in adjacent windings by focusing the flux at the center of the transformer leg, which is the area farthest from the surrounding windings.

Figure 4:
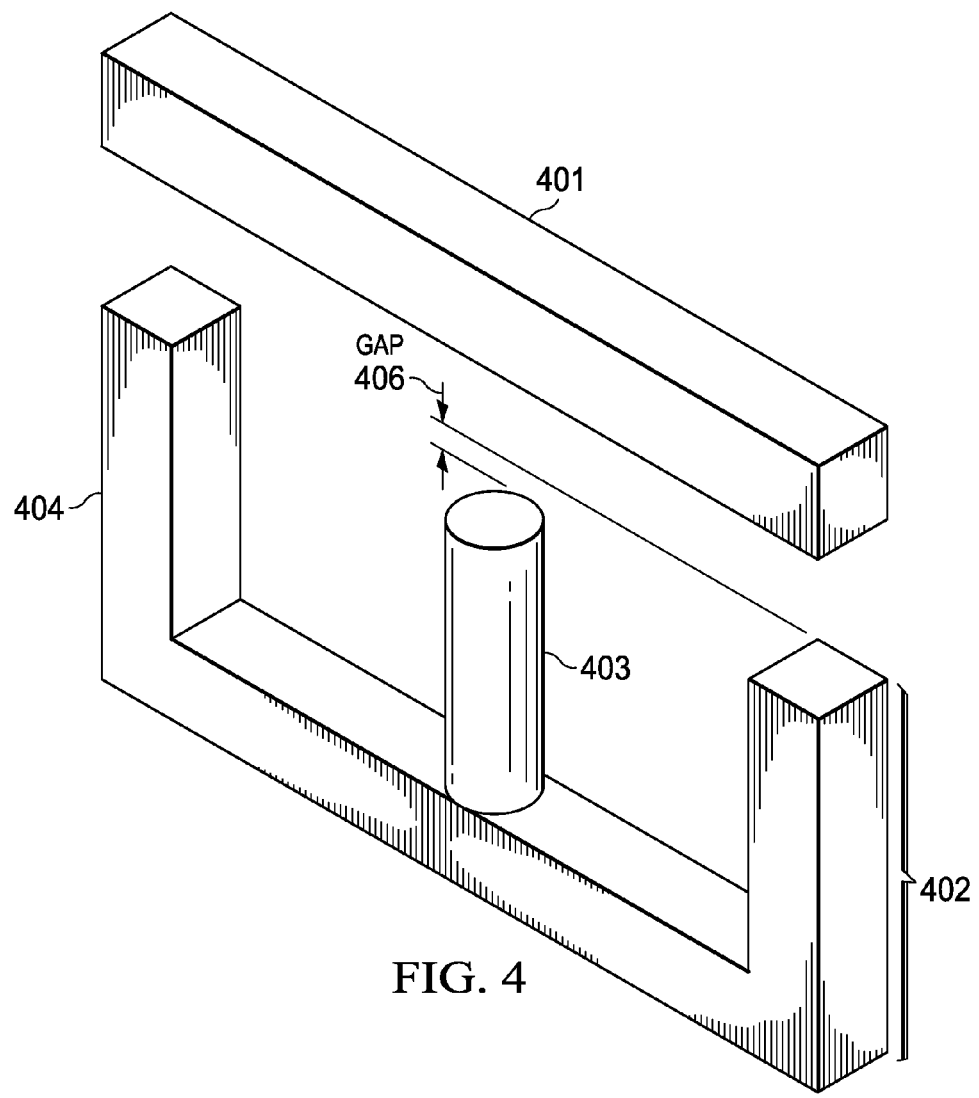
FIGS. 4 to 13 illustrate perspective views of embodiments of magnetic devices constructed according to the principles of the present invention.

Turning now to FIG. 4, illustrated is a perspective view of an embodiment of a magnetic device constructed according to the principles of the present invention. The magnetic device (e.g., a transformer) includes an "E-I" magnetic core or core having a first core section (e.g., an "I" core section 401) and a second core section (e.g., an "E" core section 402). In FIG. 4 and following FIGUREs, the first core section (e.g., the "I" core section 401) is shown displaced upward from the second core section (e.g., the "E" core section 402) to provide separated illustrations of the two core components. Also, analogous features of the embodiments of the magnetic devices illustrated and described with respect to the following FIGUREs will be designated with like reference numbers.

When the construction of the transformer is complete, the "I" core section 401 is positioned on the top of the outer legs (one of which is designated 404) of the "E" core section 402. A center leg 403 is formed shorter than the outer legs 404, thereby forming a gap 406 for the magnetic flux. The gap 406, which may be formed as an air gap or a gap including another nonmagnetic material, reduces the flux in the core, thereby reducing the tendency of the core to saturate at high current levels. Nonetheless, inclusion of the gap 406 reduces the magnetizing inductance of the transformer compared to a transformer without such a gap. The gap 406 may also be formed with a nonmagnetic material such as a plastic spacer or may include a magnetic material such a powdered magnetic material combined with a nonmagnetic binder to form a distributed gap.

Figure 5:
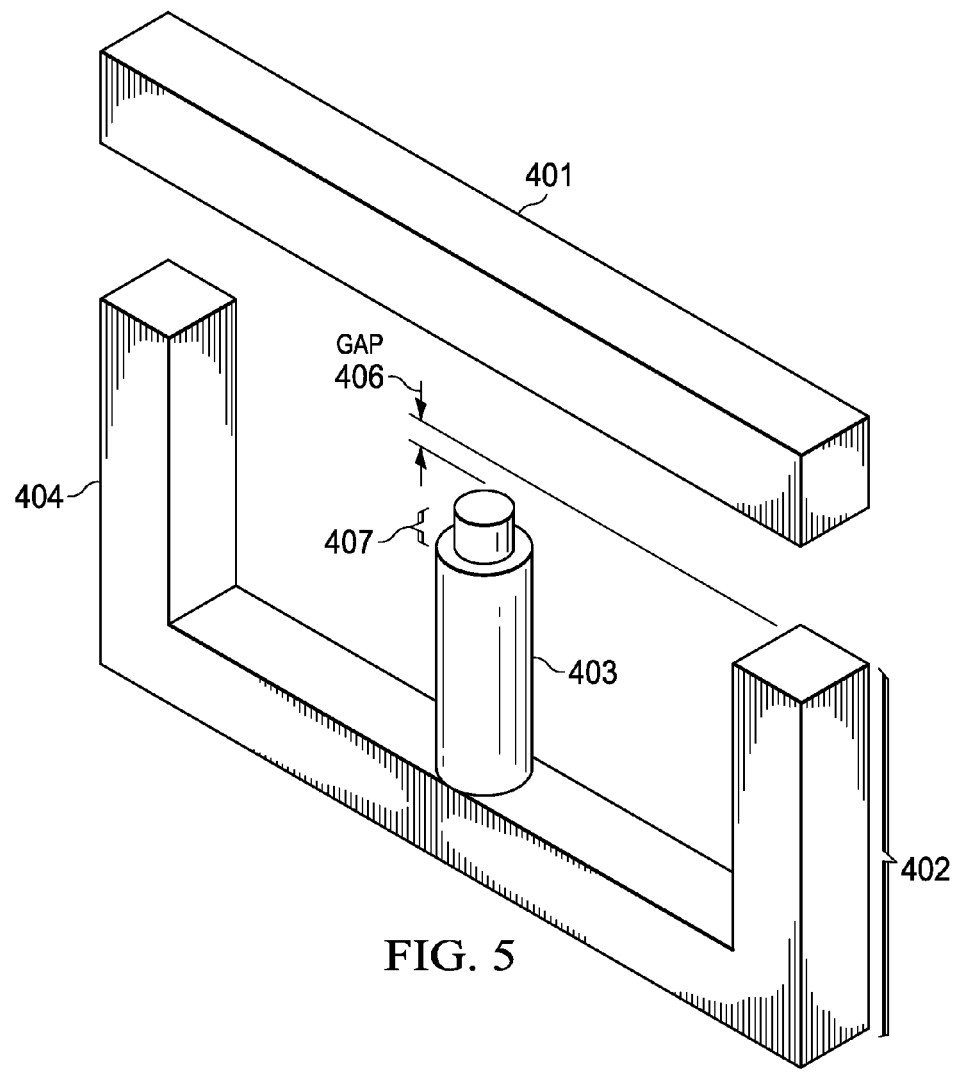

Turning now to FIG. 5, illustrated is a perspective view of an embodiment of a magnetic device (e.g., transformer) constructed according to the principles of the present invention. In addition to the "E-I" magnetic core or core and air (or other nonmagnetic material) gap 406, an end (e.g., an upper end 407) of the center leg 403 has a reduced diameter to form a non-uniform cross-sectional area of the core. The reduction of the cross-sectional area on the upper end 407 of the center leg 403 enables the upper end 407 thereof to saturate at higher current levels while not saturating at lower current levels. The reduced diameter of the upper end 407 of the center leg 403 effectively forms a longer gap at higher magnetic flux levels, which reduces the magnetizing inductance of the transformer at higher current levels. In other words, the gap 406 and the reduced cross-sectional area of the upper end 407 of the center leg 403 form a non-uniform gap that provides a variable level of magnetizing inductance dependent on a current level in the magnetic device. Thus, the magnetic device advantageously provides a variable level of core saturation for part of the core for a variable current level.

The structure shown in FIG. 5 provides a further efficiency benefit for the power converter because it concentrates flux lines in the non-uniform gap closer to the center thereof, even when the central section of the core is partly saturated. Fringing flux and losses associated with fringing flux are therefore reduced. Of course, within the broad scope of the present invention, instead of a stepped diameter of the upper end 407 of the center leg 403 to form a non-uniform gap as illustrated in FIG. 5, the upper end 407 of the center leg 403 can be tapered to enable more uniform core saturation as the magnetic flux in the core increases. In lieu of or in addition to a non-uniform gap in the center leg of the core, a non-uniform gap with reduced cross-sectional area can be formed on the outer legs 404 to achieve a similar effect. Thus, the term non-uniform gap as used herein may refer to a change in a cross-sectional area of a core (or core leg) and includes a stepped gap as well as a tapered gap.

The absence or reduction of core saturation at low flux and current levels produces a high magnetizing inductance in the transformer and enables efficient operation at low output power levels. A transformer constructed with a core leg with reduced cross-sectional area may also be constructed with essentially no gap, enabling a high magnetizing inductance to be produced for the transformer that saturates at a high current level in a controlled manner.

Figure 6:
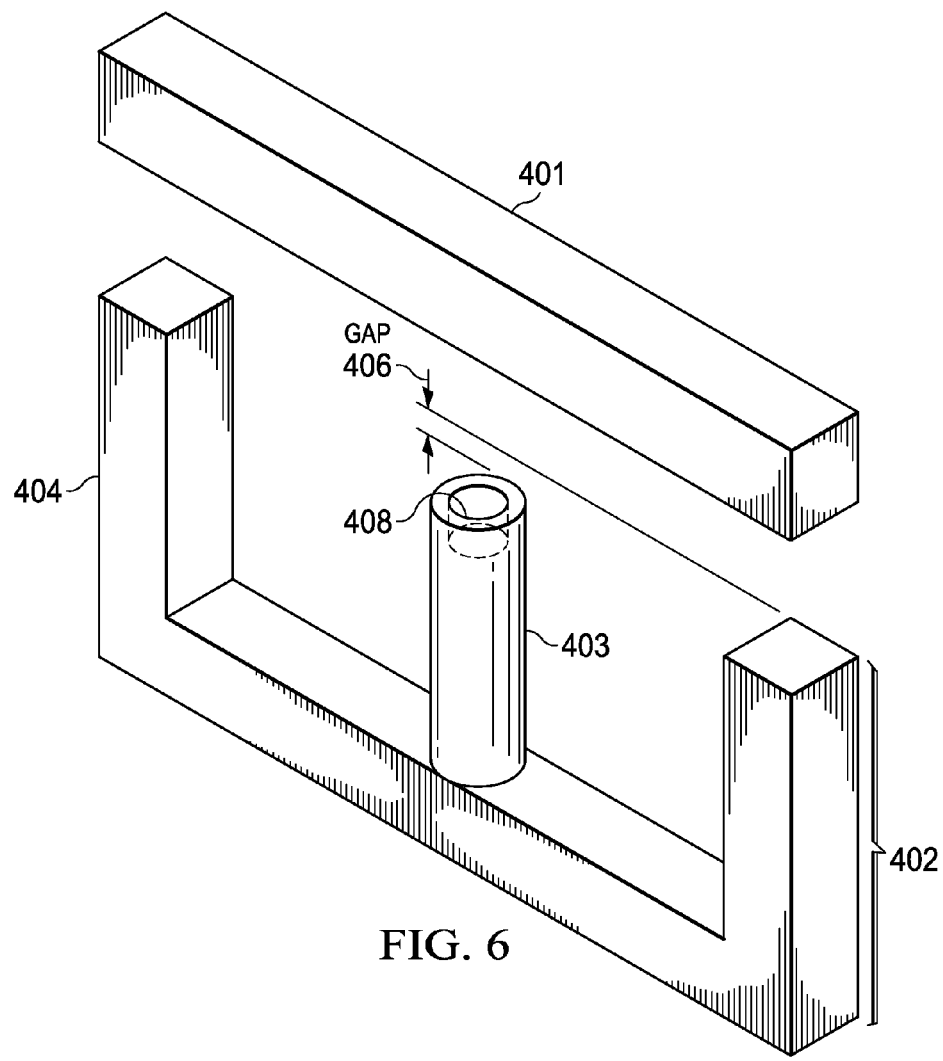

Turning now to FIG. 6, illustrated is a perspective view of an embodiment of a magnetic device (e.g., transformer) constructed according to the principles of the present invention. In addition to the "E-I" magnetic core or core and air (or other nonmagnetic material) gap 406, the center leg 403 includes a hole 408 bored therein, which enables the core to saturate at higher current levels. In other words, the gap 406 and the hole 408 in the center leg 403 form a non-uniform gap within the magnetic device. In lieu of or in addition to, the gap 406 and hole 408 in the center leg 403 may be formed with respect to one of the outer legs 404.

Figure 7:
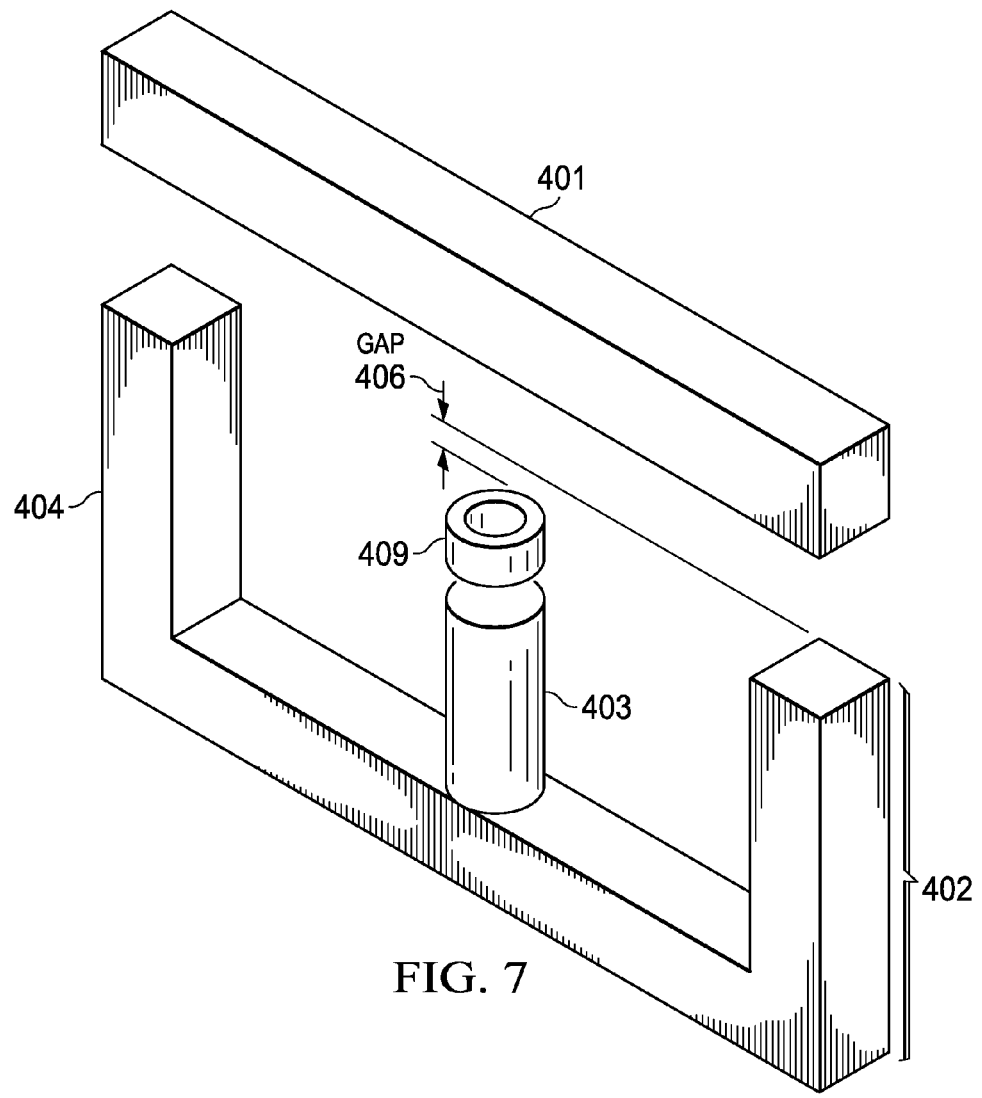

Turning now to FIG. 7, illustrated is a perspective view of an embodiment of a magnetic device (e.g., transformer) constructed according to the principles of the present invention. In addition to the "E-I" magnetic core or core and air (or other nonmagnetic material) gap 406, the transformer may include a core piecepart (e.g., a toroidal core piecepart) 409 positioned at an end of the center leg 403, which enables the core to saturate at higher current levels. FIG. 7 illustrates the core piecepart 409 above the center leg 403 for visual clarity. In practice, the core piecepart 409 may be positioned, without restriction, on the center leg 403. The core piecepart 409 may also be centered between "I" core section 401 and center leg 403 using non-magnetic spacers to further reduce fringing flux and associated losses. The core piecepart 409 provides a practical structure to form a hole in the center leg 403 of the core. The core piecepart 409 can vary on height and length providing two degrees of freedom to adjust the inductance versus current curve. The gap 406 and the core piecepart 409 form a non-uniform gap within the magnetic device. In lieu of or in addition to, the core piecepart 409 on the center leg 403 may be formed with respect to one of the outer legs 404.

Figure 8:
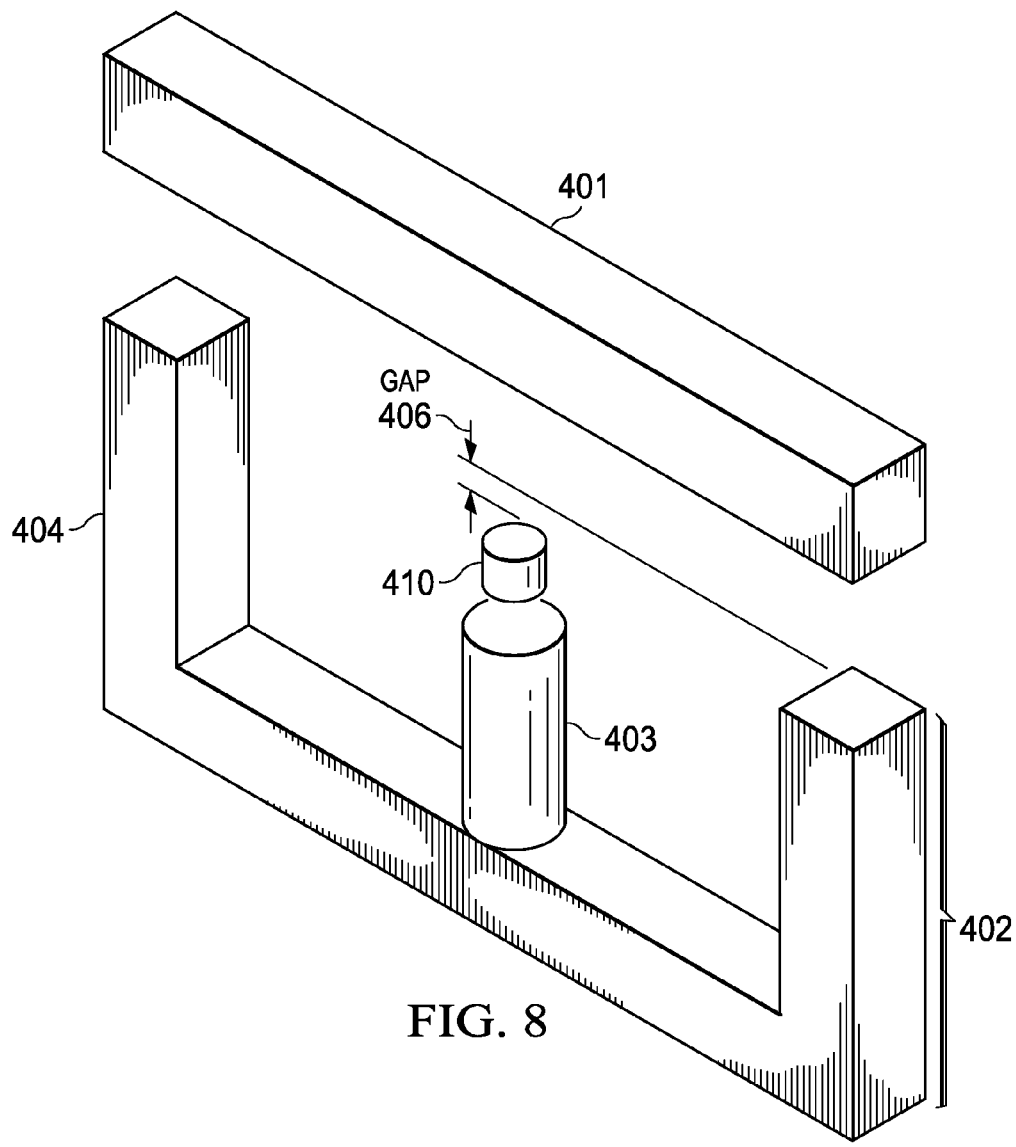

Turning now to FIG. 8, illustrated is a perspective view of an embodiment of a magnetic device (e.g., a transformer) constructed according to the principles of the present invention. In addition to the "E-I" magnetic core or core and air (or other nonmagnetic material) gap 406, an upper end of the center leg 403 has a reduced diameter formed by placing a core piecepart (e.g., a cylindrical core piecepart) 410 with reduced diameter thereon. FIG. 8 illustrates the core piecepart 410 above the center leg 403 for visual clarity. In practice, the core piecepart 410 would be positioned, without restriction, on the center leg 403. Alternatively, the core piecepart 410 can be formed with a distributed gap to eliminate the need for the gap 406. The core piecepart 410 may be formed with a non-magnetic material such as a plastic spacer or may include a magnetic material such as a powdered magnetic material combined with a nonmagnetic binder to form the distributed gap, advantageously eliminating the need for the gap 406. The aforementioned features are also applicable to the core piecepart 409 illustrated and described with respect to FIG. 7. The gap 406 and the core piecepart 409 form a non-uniform gap within the magnetic device, and the core piecepart 409 may augment the accuracy of the gap 406. In lieu of or in addition to, the core piecepart 410 on the center leg 403 may be formed with respect to one of the outer legs 404.

Figure 9:
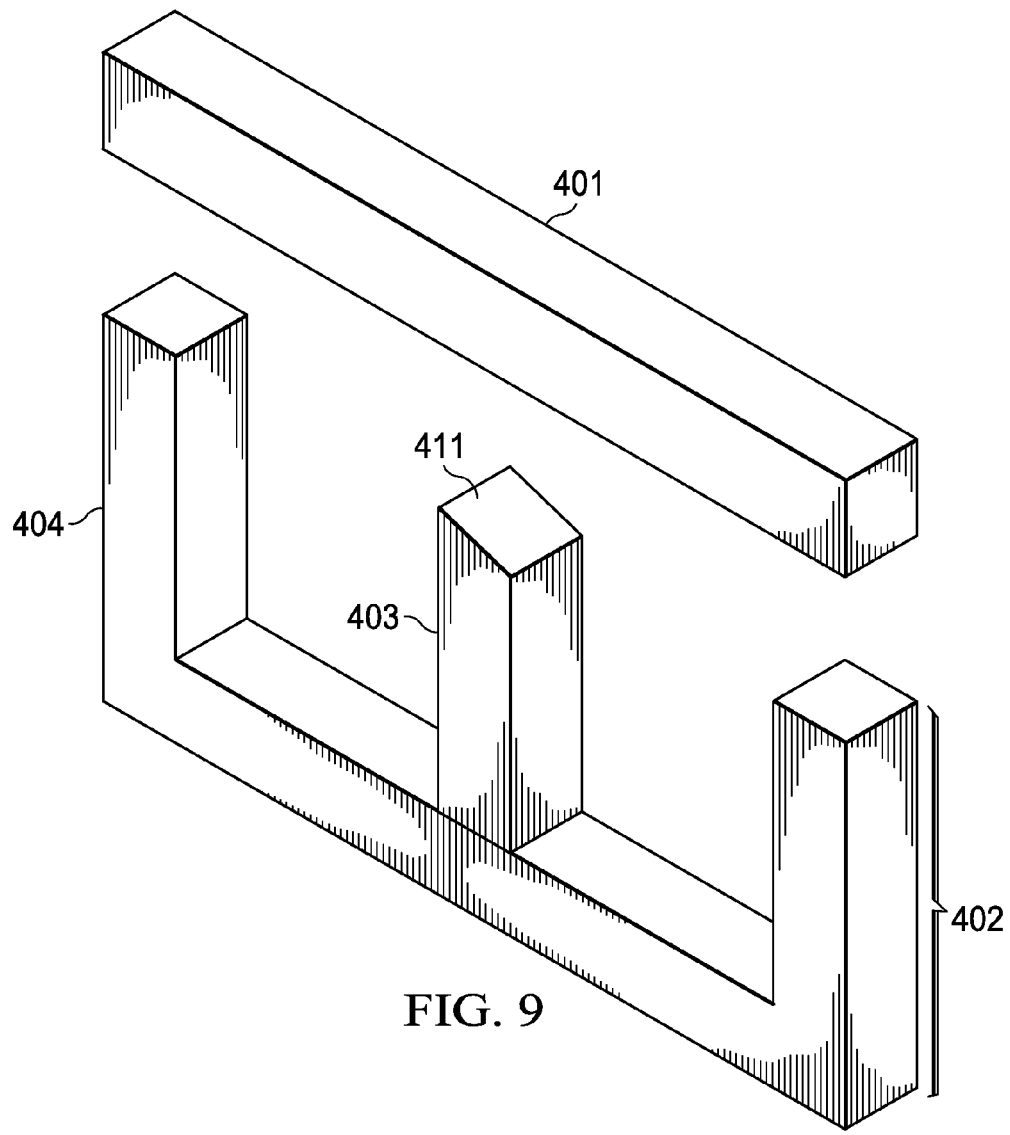

Turning now to FIG. 9, illustrated is a perspective view of an embodiment of a magnetic device (e.g., transformer) constructed according to the principles of the present invention. In addition to the "E-I" magnetic core or core, the center leg 403 may include a tapered region 411 at an end thereof to reduce a cross-sectional area of the center leg 403, which enables the core to saturate at higher current levels. In other words, the tapered region 411 forms a non-uniform gap within the magnetic device. In lieu of or in addition to, the tapered region 411 at the end of the center leg 403 may be formed with respect to one of the outer legs 404.

Non-uniform gaps in magnetic devices are traditionally formed by grinding down a portion of a core leg. This process increases the cost of the core by requiring a separate grinding operation and also reduces the accuracy of the gap length due to inaccuracies of grinding methods. In order to reduce the manufactured cost and increase dimensional accuracy of the gap lengths in a non-uniform-gap magnetic device, a method is introduced herein for creating the non-uniform gap.

Figure 10:
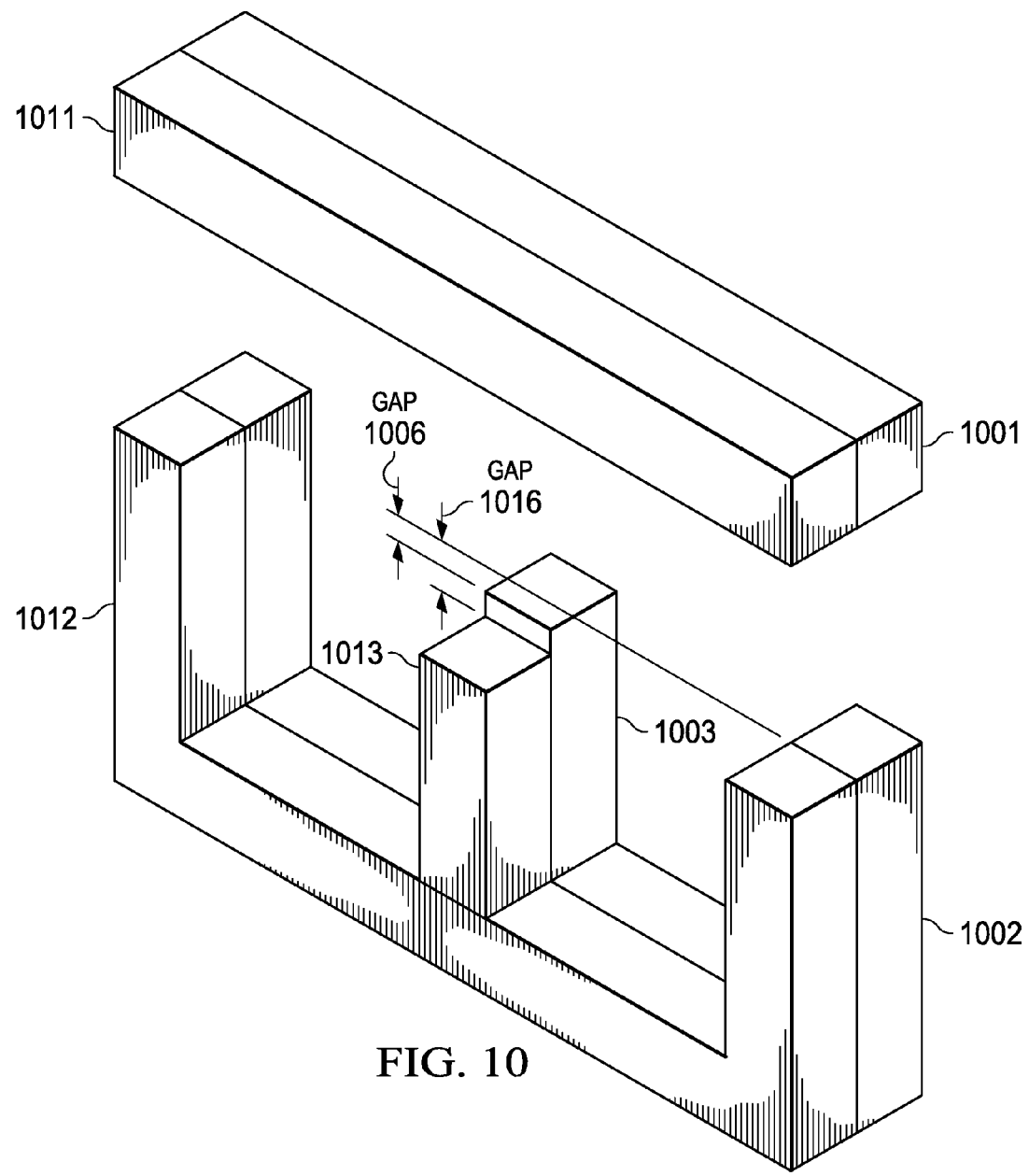

Turning now to FIG. 10, illustrated is a perspective view of an embodiment of a magnetic device (e.g., transformer) constructed according to the principles of the present invention. The transformer includes first and second magnetic cores (e.g., two "E-I" magnetic cores or cores) coupled together (e.g., positioned side-by-side, directly coupled together or adjacent). The first magnetic core includes a first core section (e.g., an "I" core section 1001) and a second core section (e.g., an "E" core section 1002). The center leg 1003 of the "E" core section 1002 is slightly shortened to form a first gap 1006. The second magnetic core includes a first core section (e.g., an "I" core section 1011) and a second core section (e.g., an "E" core section 1012). A center leg 1013 of the "E" core section 1012 is also shortened to form a second gap 1016. In this manner, an economical construction arrangement may be employed to form a non-uniform gap for the magnetic core of the transformer. In other words, the first and second gaps 1006, 1016 may have different dimensions (e.g., one gap is smaller than the other gap or the gaps are of unequal length) to form the non-uniform gap. Of course, the first and second gaps 1006, 1016 may be formed by a plurality of structures including the structures illustrated above.

Figure 11:
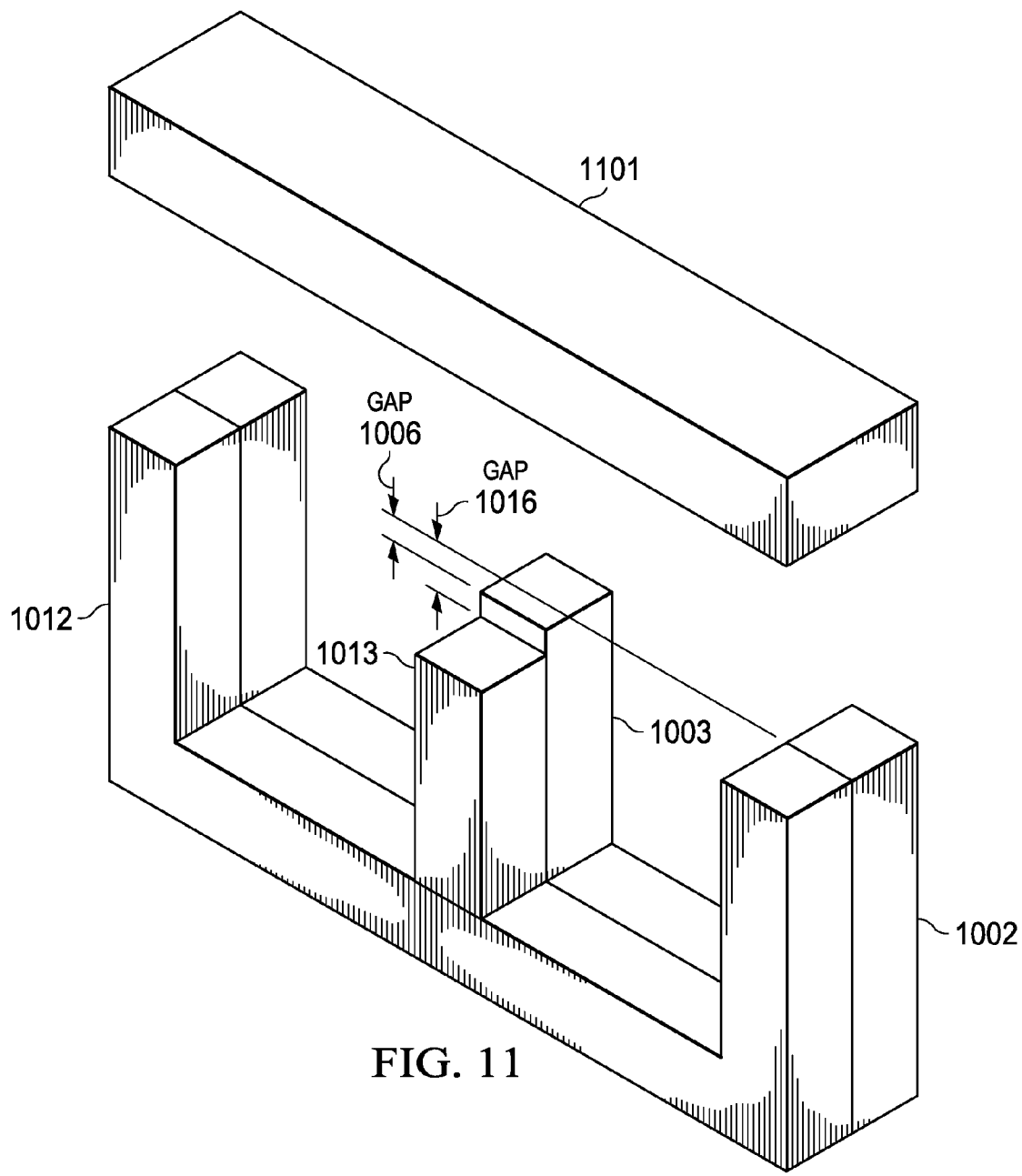

Turning now to FIG. 11, illustrated is a perspective view of an embodiment of a magnetic device (e.g., transformer) constructed according to the principles of the present invention. The transformer includes a further arrangement of first and second magnetic cores coupled together including elements similar to those illustrated and described with respect to FIG. 10. In the present embodiment, however, the "I" core sections 1001, 1011 illustrated in FIG. 10 are formed as a single "I" core section 1101. In this manner, a further economical construction arrangement may be employed to form a non-uniform gap for the transformer.

Figure 12:
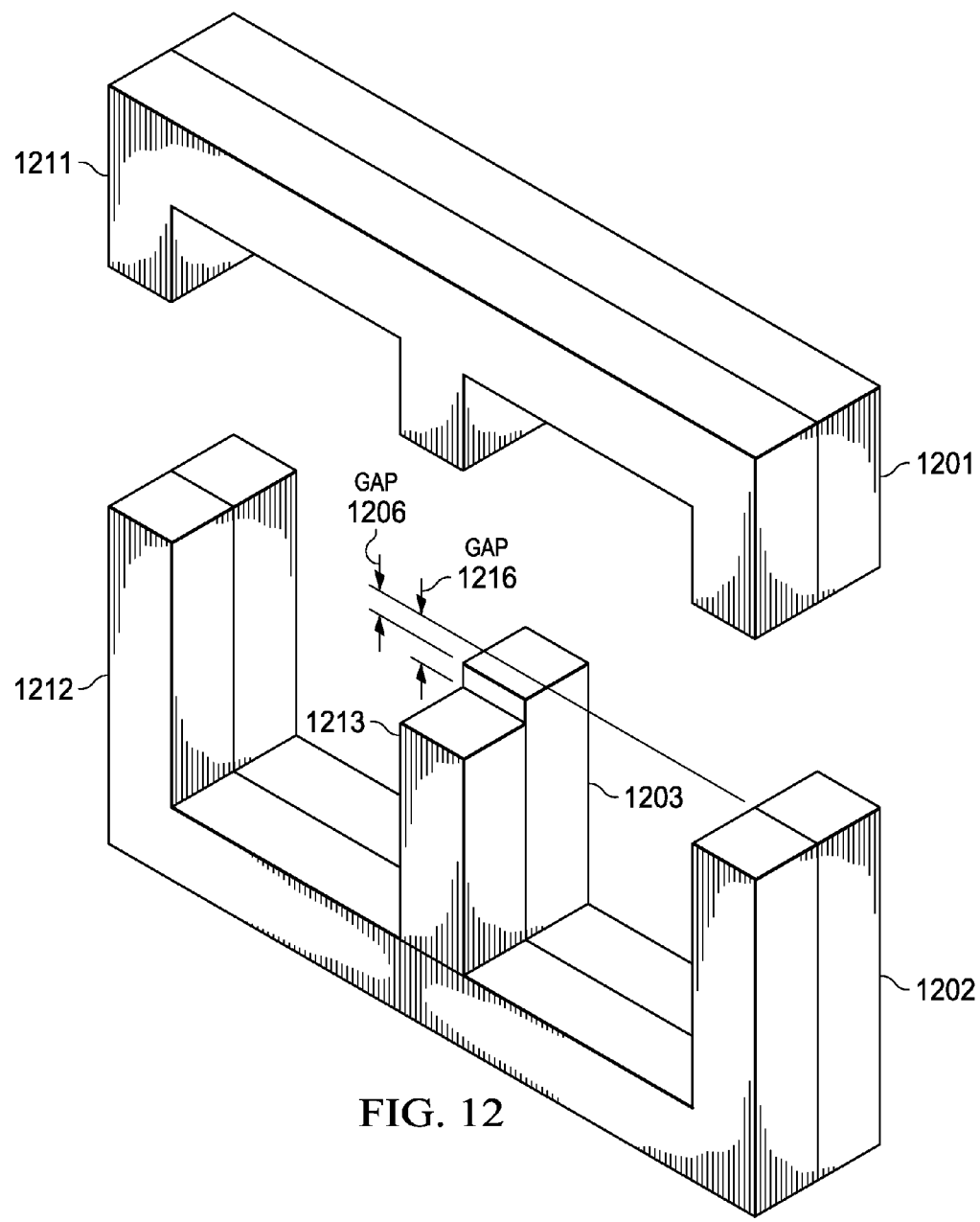

Turning now to FIG. 12, illustrated is a perspective view of an embodiment of a magnetic device (e.g., transformer) constructed according to the principles of the present invention. The transformer includes first and second magnetic cores (e.g., two "E-E" magnetic cores) coupled together (e.g., positioned side-by-side, directly coupled together or adjacent). The first magnetic core includes a first core section (e.g., an "E" core section 1201) and a second core section (e.g., an "E" core section 1202). The center leg 1203 of the "E" core section 1202 is slightly shortened to form a first gap 1206. The second magnetic core includes a first core section (e.g., an "E" core section 1211) and a second core section (e.g., an "E" core section 1212). A center leg 1213 of the "E" core section 1212 is also shortened to form a second gap 1216. In this manner, an economical construction arrangement may be employed to form a non-uniform gap for the magnetic core of the transformer. In other words, the first and second gaps 1206, 1216 may have different dimensions (e.g., one gap is smaller than the other gap or the gaps are of unequal length) to form the non-uniform gap. Of course, the first and second gaps 1206, 1216 may be formed by a plurality of structures including the structures illustrated above.

Figure 13:
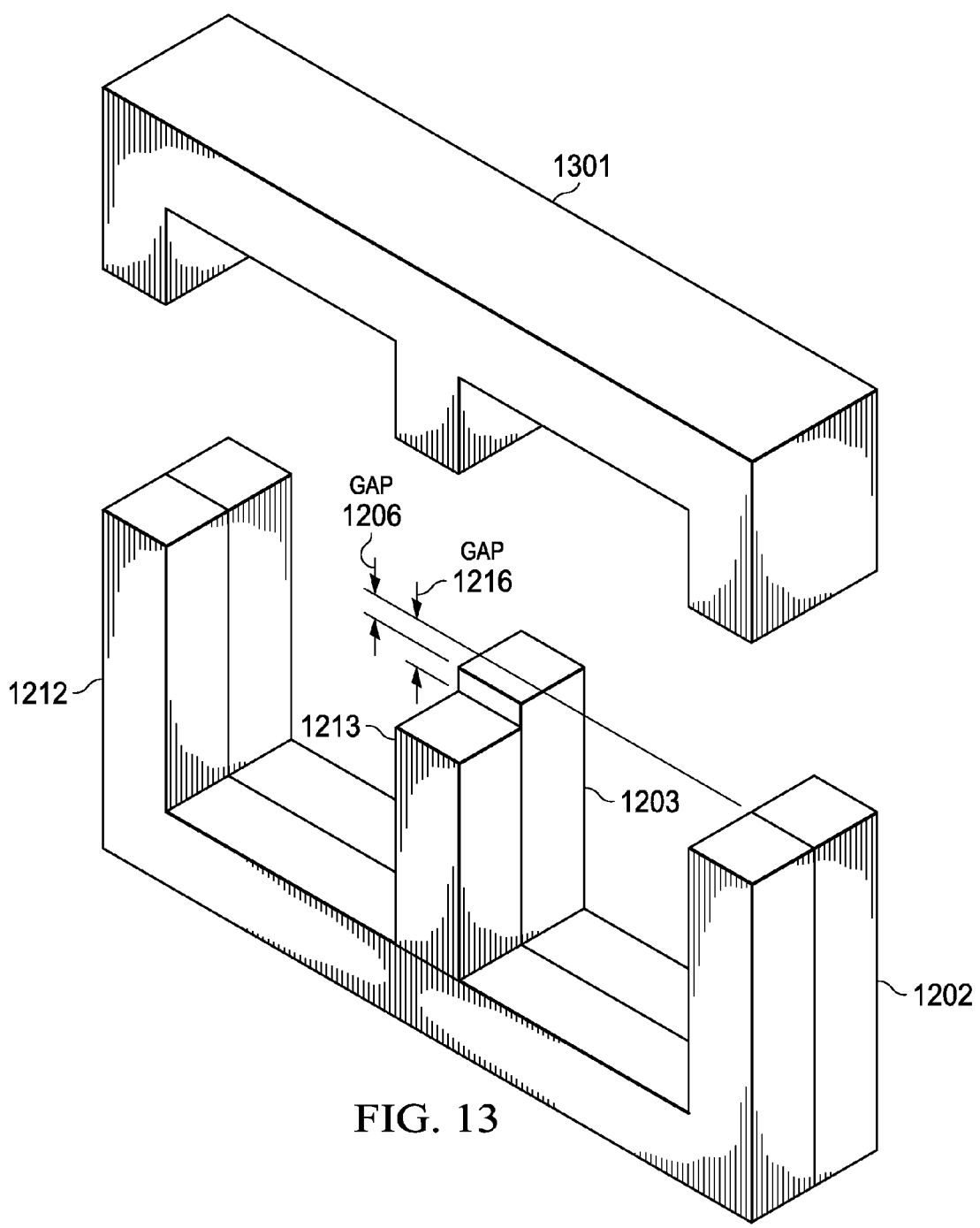

Turning now to FIG. 13, illustrated is a perspective view of an embodiment of a magnetic device (e.g., transformer) constructed according to the principles of the present invention. The transformer includes a further arrangement of first and second magnetic cores coupled together including elements similar to those illustrated and described with respect to FIG. 12. In the present embodiment, however, the "E" core sections 1201, 1211 illustrated in FIG. 12 are formed as a single "E" core section 1301. In this manner, a further economical construction arrangement may be employed to form a non-uniform gap for the transformer.

Thus, a magnetic device with a non-uniform gap has been introduced herein. In one embodiment, the magnetic device includes a first magnetic core having first and second core sections (e.g., "I" or "E" core sections), wherein the second core section of the first magnetic core has a leg (e.g., a center or outer leg) that forms a first gap (e.g., an air gap or distributed gap) with the first core section of the first magnetic core. The magnetic device also includes a second magnetic core adjacent to the first magnetic core and having first and second core sections (e.g., "I" or "E" core sections), wherein the second core section of the second magnetic core has a leg (e.g., a center or outer leg) that forms a second gap (e.g., an air gap or distributed gap) with the first core section of the second magnetic core. The first and second gaps form a non-uniform gap for the magnetic device. For instance, the first gap may be smaller than the second gap to form the non-uniform gap. Additionally, the first core section of the first and second magnetic cores may be formed as a single core section.

Those skilled in the art should understand that the previously described embodiments of a power converter including a controller and related methods of operating the same are submitted for illustrative purposes only. In addition, various other power converter topologies such as a boost power converter and a single ended primary inductor power converter topologies are well within the broad scope of the present invention. While a power converter including a controller to control a switching frequency of a power switch has been described in the environment of a power converter, the controller may also be applied to other systems such as, without limitation, a power amplifier or a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter, comprising:
   a power switch;
   a magnetic device coupled to said power switch and having a non-uniform gap, said magnetic device formed according to one of:
      said magnetic device comprising a first core section and a second core section having a leg that forms a gap with said first core section and an end of said leg having a reduced cross-sectional area to form said non-uniform gap,
      said magnetic device comprising a first core section and a second core section having a leg that forms a gap with said first core section and an end of said leg having a hole bored therein to form said non-uniform gap,
      said magnetic device comprising a first core section and a second core section having a leg that forms a gap with said first core section and a core piecepart positioned at an end of said leg to form said non-uniform gap,
      said magnetic device comprising a first core section and a second core section having a leg with a tapered region at an end thereof to form said non-uniform gap with said first core section, and
      said magnetic device comprising a first magnetic core having first and second core sections, said second core section of said first magnetic core having a leg that forms a first gap with said first core section of said first magnetic core, and a second magnetic core adjacent said first magnetic core and having first and second core sections, said second core section of said second magnetic core having a leg that forms a second gap with said first core section of said second magnetic core, said first and second gaps forming said non-uniform gap; and
   a controller, including:
      a detector configured to sense a condition representing an output power of said power converter; and
      a control circuit configured to control a switching frequency of said power switch as a function of said condition and control a duty cycle of said power switch to regulate an output characteristic of said power converter.

2. The power converter as recited in claim 1 wherein said control circuit is configured to reduce said switching frequency in accordance with a reduction of said output power.

3. The power converter as recited in claim 1 further comprising a diode coupled to said magnetic device.

4. The power converter as recited in claim 1 further comprising an output filter capacitor coupled to an output of said power converter.

5. The power converter as recited in claim 1 further comprising a feedback path from an output of said power converter to said controller.

6. The power converter as recited in claim 1 wherein said power switch is a metal-oxide semiconductor field-effect transistor.

7. The power converter as recited in claim 1 wherein said power converter employs a flyback power train.

8. The power converter as recited in claim 1 wherein said detector comprises a resistor, a capacitor and a diode.

9. The power converter as recited in claim 1 wherein said control circuit comprises a frequency control circuit configured to control said switching frequency of said power switch and a pulse-width modulator configured to control said duty cycle of said power switch.

10. The power converter as recited in claim 1 wherein said control circuit comprises a timing capacitor, a timing resistor, an amplifier, a current minor, and a pulse-width modulator.

11. The power converter as recited in claim 1 wherein said condition representing said output power of said power converter comprises at least one of a current associated with said power switch and an output current of said power converter.

12. The power converter as recited in claim 1 wherein said control circuit is configured to provide a continuous change of said switching frequency as a function of a change of said condition.

13. The power converter as recited in claim 1 wherein said control circuit is configured to provide a lower limit of said switching frequency for said power switch.

14. The power converter as recited in claim 1 wherein said control circuit is configured to control said switching frequency of said power switch during a non burst mode of operation of said power converter.

15. The power converter as recited in claim 1 wherein said condition representing said output power of said power converter is provided in accordance with a selected input voltage of said power converter.

16. A method of operating a power converter, comprising:
providing a power switch;
coupling a magnetic device having a non-uniform gap to said power switch, said magnetic device formed according to one of:
said magnetic device comprising a first core section and a second core section having a leg that forms a gap with said first core section and an end of said leg having a reduced cross-sectional area to form said non-uniform gap,
said magnetic device comprising a first core section and a second core section having a leg that forms a gap with said first core section and an end of said leg having a hole bored therein to form said non-uniform gap,
said magnetic device comprising a first core section and a second core section having a leg that forms a gap with said first core section and a core piecepart positioned at an end of said leg to form said non-uniform gap,
said magnetic device comprising a first core section and a second core section having a leg with a tapered region at an end thereof to form said non-uniform gap with said first core section, and
said magnetic device comprising a first magnetic core having first and second core sections, said second core section of said first magnetic core having a leg that forms a first gap with said first core section of said first magnetic core, and a second magnetic core adjacent said first magnetic core and having first and second core sections, said second core section of said second magnetic core having a leg that forms a second gap with said first core section of said second magnetic core, said first and second gaps forming said non-uniform gap;
sensing a condition representing an output power of said power converter;
controlling a switching frequency of said power switch as a function of said condition; and
controlling a duty cycle of said power switch to regulate an output characteristic of said power converter.

17. The method as recited in claim 16 wherein said controlling said switching frequency of said power switch comprises reducing said switching frequency in accordance with a reduction of said output power.

18. The method as recited in claim 16 wherein said controlling said switching frequency of said power switch comprises providing a continuous change of said switching frequency as a function of a change of said condition.

19. The method as recited in claim 16 wherein said controlling said switching frequency of said power switch comprises providing a lower limit of said switching frequency for said power switch.

20. The method as recited in claim 16 wherein said condition representing said output power of said power converter is provided in accordance with a selected input voltage of said power converter.

* * * * *

UNITED STATES PATENT AND TRADEMARK OFFICE
CERTIFICATE OF CORRECTION

PATENT NO. : 8,514,593 B2  
APPLICATION NO. : 12/486520  
DATED : August 20, 2013  
INVENTOR(S) : Antony Brinlee et al.

Page 1 of 1

It is certified that error appears in the above-identified patent and that said Letters Patent is hereby corrected as shown below:

In the Claims

Column 14, claim 10, line 67, delete "minor" and insert --mirror--.

Signed and Sealed this  
Third Day of December, 2013

Margaret A. Focarino  
*Commissioner for Patents of the United States Patent and Trademark Office*